(12) United States Patent
Csinger et al.

(10) Patent No.: US 10,509,898 B2
(45) Date of Patent: Dec. 17, 2019

(54) ENHANCED SECURITY AUTHENTICATION METHODS, SYSTEMS AND MEDIA

(71) Applicant: FUSIONPIPE SOFTWARE SOLUTIONS, Vancouver (CA)

(72) Inventors: Andrew Csinger, Vancouver (CA); Ildar Muslukhov, Vancouver (CA); Hassan Khosravi, Vancouver (CA); Peter Tuan Luong, Vancouver (CA)

(73) Assignee: Jim Barney et al., Cincinnati, OH (US)

( * ) Notice: Subject to any disclaimer, the term of this patent is extended or adjusted under 35 U.S.C. 154(b) by 17 days.

(21) Appl. No.: 15/545,556

(22) PCT Filed: Jan. 21, 2016

(86) PCT No.: PCT/CA2016/050047
§ 371 (c)(1),
(2) Date: Jul. 21, 2017

(87) PCT Pub. No.: WO2016/115633
PCT Pub. Date: Jul. 28, 2016

(65) Prior Publication Data
US 2018/0004930 A1    Jan. 4, 2018

Related U.S. Application Data

(60) Provisional application No. 62/106,149, filed on Jan. 21, 2015, provisional application No. 62/121,748, filed on Feb. 27, 2015.

(51) Int. Cl.
*H04L 29/06* (2006.01)
*G06F 21/40* (2013.01)
(Continued)

(52) U.S. Cl.
CPC ............ *G06F 21/40* (2013.01); *G06F 21/316* (2013.01); *H04L 9/085* (2013.01); *H04L 9/0825* (2013.01);
(Continued)

(58) Field of Classification Search
CPC .......... H04L 2463/082; H04L 63/0853; G06F 21/316
See application file for complete search history.

(56) References Cited

U.S. PATENT DOCUMENTS 7,788,499 B2 *   8/2010   Cameron ................ G06F 21/33
                                                    713/185
8,775,819 B2     7/2014   Hamid et al.
(Continued)

OTHER PUBLICATIONS

Barisch, M. "Design and Evaluation of an Architecture for Ubiquitous User Authentication Based on Identity Management Systems," Proceedings of the 10th IEEE International Conference on Trust, Security and Privacy in computing and Communications, Changsha, China, Nov. 16-18, 2011, pp. 863-872.
(Continued)

*Primary Examiner* — Thaddeus J Plecha
(74) *Attorney, Agent, or Firm* — Chernoff Vilhauer LLP

(57) ABSTRACT

A transaction authorization apparatus includes a processor in communication with a communications interface. The processor is configured to receive a request for a transaction requested by a user with whom a plurality of user devices are associated, to obtain respective transaction measurements from at least some available devices from among the plurality of user devices, and to confirm approval of the request for the transaction in response to confirmation that the transaction measurements satisfy a multi-device authorization policy associated with the transaction.

20 Claims, 7 Drawing Sheets

(51) Int. Cl.
*G06F 21/31* (2013.01)
*H04L 9/08* (2006.01)
*H04L 9/32* (2006.01)

(52) U.S. Cl.
CPC .......... *H04L 9/3234* (2013.01); *H04L 9/3247* (2013.01); *H04L 63/0853* (2013.01); *H04L 2463/082* (2013.01)

(56) References Cited

U.S. PATENT DOCUMENTS

| | | | | |
|---|---|---|---|---|
| 9,380,058 | B1* | 6/2016 | Ligatti | H04L 63/0853 |
| 2003/0115142 | A1 | 6/2003 | Brickell et al. | |
| 2007/0288750 | A1* | 12/2007 | Camenisch | G06F 21/33 |
| | | | | 713/168 |
| 2012/0014521 | A1* | 1/2012 | Hammouri | H04L 9/083 |
| | | | | 380/44 |
| 2013/0167215 | A1* | 6/2013 | Yang | G06F 21/35 |
| | | | | 726/7 |
| 2013/0198801 | A1 | 8/2013 | Nishizawa et al. | |
| 2014/0189350 | A1* | 7/2014 | Baghdasaryan | H04L 9/3271 |
| | | | | 713/168 |
| 2014/0189841 | A1 | 7/2014 | Metke et al. | |
| 2014/0289821 | A1* | 9/2014 | Wilson | G06Q 20/42 |
| | | | | 726/5 |
| 2016/0026683 | A1* | 1/2016 | Sah | G06F 16/2453 |
| | | | | 707/770 |
| 2016/0042168 | A1* | 2/2016 | Holland | G06F 21/34 |
| | | | | 726/7 |
| 2016/0134609 | A1* | 5/2016 | Durham | H04L 63/08 |
| | | | | 726/7 |
| 2016/0189134 | A1* | 6/2016 | Voege | G06Q 20/3226 |
| | | | | 705/44 |

OTHER PUBLICATIONS

Hocking, C. G. et al., "A Distributed and Cooperative User Authentication Framework," Proceedings of the Sixth International Conference on Information Assurance and Security (IAS), Atlanta, GA, Aug. 23-25, 2010, pp. 304-310.

Recordon, E. et al., "OAuth 2.0 Device Profile," draft-recordon-oauth-v2-device-00, Network Working Group, Internet-Draft, 8 pages, Jul. 2010, http://tools,ietf.org/pdf/draft-recordon-oauth-v2-device-00.pdf.

International Search Report prepared by the Canadian Intellectual Property Office for PCT/CA2016/050047, dated May 2, 2016, 4 pages.

Written Opinion prepared by the Canadian Intellectual Property Office for PCT/CA2016/050047, dated May 2, 2016, 5 pages.

* cited by examiner

ENHANCED SECURITY AUTHENTICATION METHODS, SYSTEMS AND MEDIA

CROSS-REFERENCE TO RELATED APPLICATIONS

This application claims the benefit of priority from U.S. Patent Application No. 62/106,149 filed on Jan. 21, 2015, and from U.S. Patent Application No. 62/121,748 filed on Feb. 27, 2015, the complete disclosures of which are hereby incorporated herein by reference.

FIELD OF THE INVENTION

The present application relates to security, and more particularly to methods, systems and computer-readable media for enhanced security authentication.

BACKGROUND

Most businesses today have an online presence, necessitating rigorous security measures to protect their confidential information and assets. For example, banks, brokerages and other financial institutions generally permit their customers to engage in online financial transactions. For merchant retailers, online sales transactions account for an ever-increasing percentage of overall sales, and some merchants operate entirely online with no physical stores in existence. Professional firms such as law or engineering firms, corporations in all areas of business, and governmental organizations often grant their employees online access to internal trade secrets, private customer information and other highly confidential and valuable internal information. However, the ever-increasing popularity of these various types of online transactions has given rise to a corresponding increase in online fraud by hackers and other criminals, resulting in an ever-increasing need for greater online security.

One of the limiting factors affecting the security and authenticity of a requested transaction relates to the operating conditions of the entity requesting the transaction. Ideally, the trust accorded to an entity should be carefully metered based on knowledge of attributes of that entity (e.g., security capabilities, exploitability, coercibility, etc.). Unfortunately, software-only based solutions cannot by themselves form a reliable basis for a system to provide the desired property of non-repudiation for the transaction. That is why it is a common requirement that tamper-resistant hardware, e.g., a trusted computing module or a one-time password (OTP) token, participate in a transaction to warrant a higher level of assurance and to provide non-repudiation to the transaction.

There are practical difficulties with the use of tamper-resistant hardware. For example, not all modern devices are released with tamper-resistant hardware, due to economical and pragmatic reasons, and small Internet-of-Things (IoT) devices are typically among the least-endowed. Access to the tamper-resistant hardware might be limited by vendors or regulators, or might be otherwise unavailable. Alternatively, access to the tamper-resistant hardware might be inconvenient or expensive.

Fortunately, it is likely that an individual already owns a device which is equipped with some type of tamper-resistant hardware, such as one of the following examples:
a phone with a sim card;
a phone with a secure element (e.g., iOS or Intel SGX) or hardware based isolation (e.g., Samsung and KNOX);
a laptop with a Trusted Platform Module (TPM); or
a wearable device with a secure element (e.g., Apple Watch).

Even when the desired access to tamper-resistant hardware is available on a given device, it might not be the device preferred for the contemplated action. For instance, a smartphone with a secure element in the sim card might be the most secure way to access an online service, but a user may prefer to use a tablet with a bigger screen for that action, even though it lacks the required security features. Today, in such a scenario, users will typically make a tradeoff that compromises security in favor of usability and convenience.

SUMMARY

In an illustrative embodiment, a transaction authorization apparatus includes a processor in communication with a computer-readable medium and a communications interface. The processor is configured to receive a request for a transaction requested by a user with whom a plurality of user devices are associated, and to obtain respective transaction measurements from a plurality of available devices from among the plurality of user devices. The processor is further configured to confirm approval of the request for the transaction in response to confirmation that the transaction measurements satisfy a multi-device authorization policy associated with the transaction.

Advantageously, by imposing a multi-device authorization policy that requires a plurality of user devices (also referred to herein as a conspiracy of devices) to conspire or co-operate together to authenticate a transaction, the security of the transaction can be significantly enhanced and can be customized according to a given party's needs as reflected in the policy associated with the transaction. For example, a party relying upon the user's authentication could require, via the policy, that a minimum number of devices associated with the user participate in the authorization for the transaction, or that one or more specific devices associated with the user participate in the authorization, thereby reducing the risk that fraud may result from a single device being compromised. Moreover, such a method advantageously abolishes the traditional trade-off between security and convenience mentioned above: a user may choose to use the most convenient device (e.g. a tablet) for the transaction, but the transaction may nevertheless benefit from the involvement of higher-security devices among the conspiracy of user devices. In other words, the conspiracy set of the user's available devices allows the parties to use the most convenient device for the transaction regardless of that device's security, while at the same time benefitting from a security level that is as high as or greater than that of the most secure individual device among the conspiracy.

The transaction may be selected from the group consisting of authentication, authorization, and use of a service. Consequently, virtually every transaction requiring authentication of the user's identity may benefit from embodiments of the present invention.

The available devices may include at least one Internet of Things (IoT) device. In this regard, although much attention has been devoted to increasing the security of IoT devices themselves, such devices have not historically been used to enhance security and authenticity of transactions to which the IoT devices are unrelated. Advantageously, therefore, such embodiments leverage existing, emerging and future IoT devices in service of general transaction security and authenticity. In this regard, due to the additive contributions to security made by the various individual devices in the conspiracy, an individual device such as an IoT device need not be secure itself in order to contribute to the security of the conspiracy of devices.

The available devices may include at least one device that lacks a secure element. Similarly, the available devices may include at least one device that lacks a Trusted Platform Module (TPM). In this regard, as with the more specific example of IoT devices, each requirement in the policy for an additional device increases the overall security of the transaction, even if a specific individual device is not itself secure.

The available devices may include at least one device associated with a second user who is associated with the user. Such embodiments may be advantageous where both the user's and the second user's authorization are required for a given transaction, such as a joint bank account transaction in excess of a threshold monetary amount, for example.

The available devices may include at least one virtual device. Alternatively, all of the available devices may be physical hardware devices.

The available devices may cooperate to form the appearance of a single end-point for the transaction.

In some embodiments, the apparatus includes a relying party system associated with a party relying upon the user's authentication in respect of the transaction. In such embodiments, the processor includes a processor of the relying party system, and the processor is configured to receive the request for the transaction by receiving, at the relying party system, a transaction request message from a first user device of the plurality of user devices.

The processor of the relying party system may be configured to generate and transmit a request response to the first user device, the request response defining the multi-device authorization policy for the transaction.

The processor of the relying party system may be configured to generate the request response to define the multi-device authorization policy using at least one Boolean expression, which may include at least one disjunctive condition, or at least one conjunctive condition, or a combination of at least one conjunctive and at least one disjunctive condition, or more generally, any combination of Boolean conditions.

The processor of the relying party system may be configured to generate the request response to include a condition that requires transaction measurements to be obtained from at least a minimum number of user devices. Alternatively, or in addition, the processor of the relying party system may be configured to generate the request response to include a condition requiring respective transaction measurements to be transmitted directly to the relying party system from at least a minimum number of user devices. Alternatively, or in addition, the processor of the relying party system may be configured to generate the request response to further specify whether at least one user device is required to obtain user interaction before transmitting its transaction measurement.

The processor of the relying party system may be configured to directly receive at least one of the transaction measurements from at least one of the available devices.

The processor of the relying party system may be configured to receive, from the first user device, the transaction measurement of at least one of the available devices other than the first user device.

The processor of the relying party system may be configured to obtain the transaction measurement for at least one of the user devices by obtaining a digital signature capable of being validated by at least the relying party system, and the processor of the relying party system may be further configured to validate the digital signature.

In other embodiments that are complementary to the relying party system embodiments described above, the apparatus includes a first user device of the plurality of user devices, the processor includes a processor of the first user device, and the processor of the first user device is configured to receive the request for the transaction by receiving user input from the user at the first user device.

The processor of the first user device may be configured to transmit a transaction request message to a relying party system.

The processor of the first user device may be configured to obtain the transaction measurements by: receiving a request response message from the relying party system, the request response message defining the multi-device authorization policy; transmitting an authorization request message to at least some of the available devices; and receiving the transaction measurements from the at least some of the available devices. In such embodiments, the processor of the first user device may be further configured to transmit each received transaction measurement to the relying party system.

The processor of the first user device may be configured to obtain a digital signature from at least some of the available devices.

The processor of the first user device may be configured to obtain a respective share of a shared secret from at least some of the available devices.

Each share of the shared secret may include a portion of an encryption key, and the processor of the first user device may be configured to reconstruct the encryption key from the portions of the encryption key, decrypt an encrypted credential using the encryption key, and transmit the credential to a relying party system for validation.

The processor of the first user device may be configured to receive a validation message from the relying party confirming that the credential has been validated by the relying party.

In another illustrative embodiment, a transaction authorization apparatus includes means for receiving a request for a transaction requested by a user with whom a plurality of user devices are associated. The apparatus further includes means for obtaining respective transaction measurements from at least some available devices from among the plurality of user devices, and means for confirming approval of the request for the transaction in response to confirmation that the transaction measurements satisfy a multi-device authorization policy associated with the transaction.

In another illustrative embodiment, a transaction authorization method includes receiving a request for a transaction requested by a user with whom a plurality of user devices are associated, and obtaining respective transaction measurements from at least some available devices from among the plurality of user devices. The method further includes confirming approval of the request for the transaction in response to confirmation that the transaction measurements satisfy a multi-device authorization policy associated with the transaction.

In another illustrative embodiment, a transaction authorization apparatus, suitable for use in a relying party system, includes a processor in communication with a computer-readable medium and a communications interface. The processor is configured to: (a) receive, from a user device, a request for a transaction requested by a user with whom a plurality of user devices including the user device are associated; (b) inform the user device of a multi-device authorization policy that must be satisfied for the transaction to be approved; (c) receive, from the user device, respective transaction measurements obtained by the user device from at least some available devices from among the plurality of user devices; (d) directly obtain respective transaction measurements from at least some other available devices from among the plurality of user devices; and (e) approve the request for the transaction if the transaction measurements received from the user device and the transaction measurements directly obtained from the other available devices satisfy the multi-device authorization policy associated with the transaction. Similarly, in a related embodiment, a transaction authorization method, suitable for execution by a relying party system, includes steps (a) to (e) of this paragraph above.

In another illustrative embodiment, a transaction authorization apparatus, suitable for use as a user device to initiate transactions, includes a processor in communication with a computer-readable medium and a communications interface. The processor is configured to: (a) transmit to a relying party system, a request for a transaction requested by a user with whom a plurality of user devices are associated; (b) receive, from the relying party system, requirements of a multi-device authorization policy that must be satisfied for the transaction to be approved; (c) directly obtain respective transaction measurements from at least some available devices from among the plurality of user devices; (d) transmit the transaction measurements to the relying party system; and (e) receive approval of the request for the transaction from the relying party system, if the transaction measurements and any transaction measurements obtained directly by the relying party system from any of the plurality of user devices satisfy the multi-device authorization policy associated with the transaction. Similarly, in a related embodiment, a transaction authorization method, suitable for execution by a user device to initiate a transaction, includes steps (a) to (e) of this paragraph above.

In another illustrative embodiment, a transaction authorization apparatus, suitable for use as one of a plurality of user devices associated with a user, includes a processor in communication with a computer-readable medium and a communications interface. The processor is configured to: (a) receive from a user device, in respect of a request for a transaction requested by the user with whom the plurality of user devices are associated, a request for a transaction measurement, the request including an indication of requirements of a multi-device transaction policy that must be satisfied for the transaction to be approved; and (b) generate and transmit the requested transaction measurement to the user device, wherein the transaction measurement includes a digital signature of a message that includes at least part of the request for the transaction measurement. Similarly, in a related embodiment, a transaction authorization method, suitable for execution by a user device participating in but not initiating the transaction, includes steps (a) and (b) of this paragraph above.

In another illustrative embodiment, a computer-readable medium stores instructions which, when executed by at least one processor, cause any one or more of the methods described herein to be carried out.

Other aspects and features of illustrative embodiments will become apparent to those ordinarily skilled in the art upon review of the following description of such embodiments in conjunction with the accompanying figures.

BRIEF DESCRIPTION OF THE DRAWINGS

In drawings which illustrate embodiments of the present disclosure.

DETAILED DESCRIPTION

Figure 1:
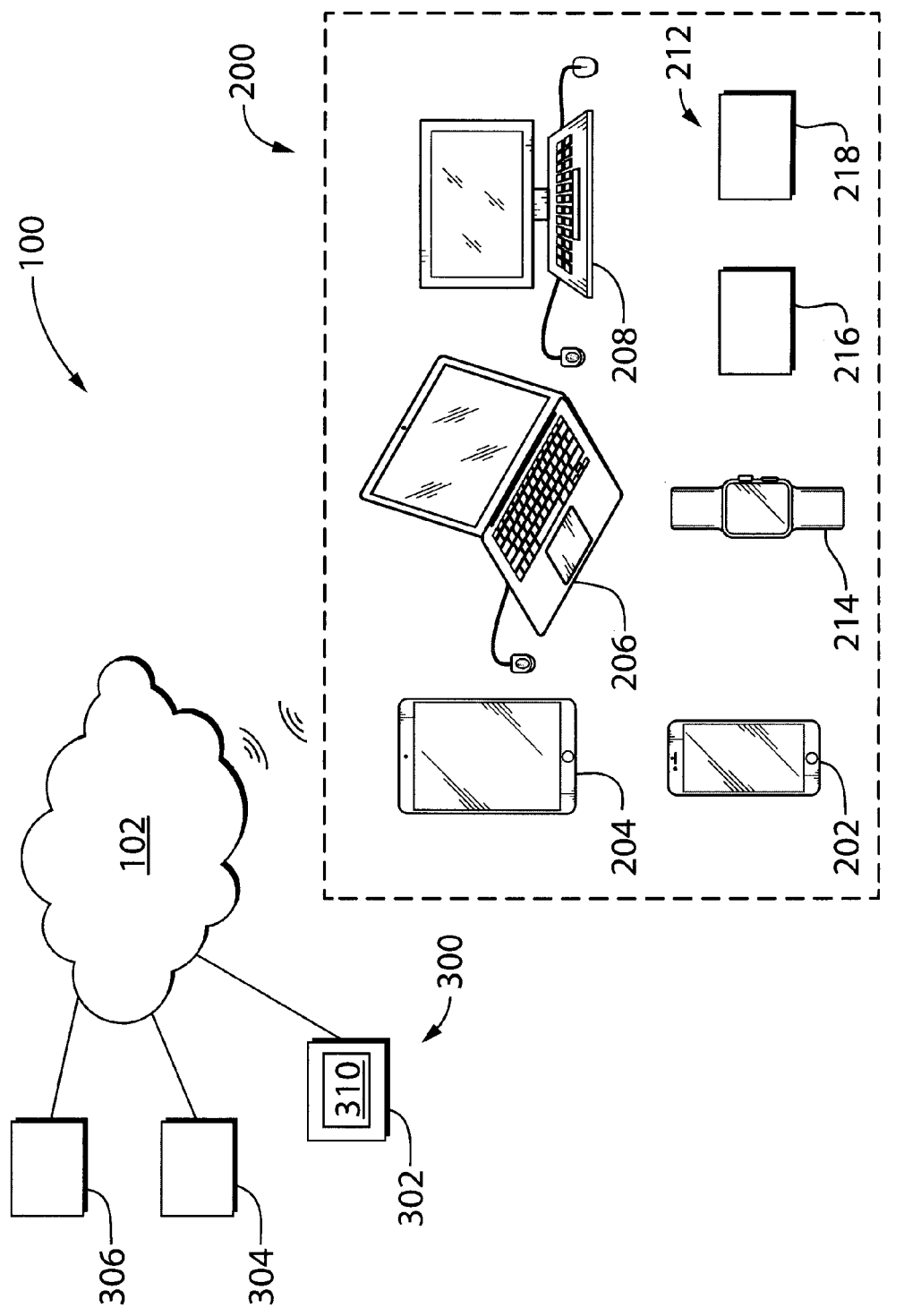
FIG. 1 depicts a system for enhanced security authentication according to a first embodiment of the invention.

Referring to FIG. 1, a transaction authorization system according to a first embodiment of the invention is shown generally at 100 in FIG. 1. In this embodiment, the system 100 includes a plurality of user devices 200 associated with a particular user, and one or more relying party systems 300 associated with one or more relying parties which will be relying upon an authentication of the user in order to authorize a transaction requested by the user. In this embodiment, each of the relying party systems 300 is capable of communicating with at least one of the user devices 200 via a communication network 102. In this embodiment, the communication network includes the Internet.

In this embodiment, as discussed in greater detail below, a processor of each of the relying party systems is configured to receive a request for a transaction requested by a user with whom a plurality of user devices are associated, to obtain respective transaction measurements from at least some available devices from among the plurality of user devices, and to confirm approval of the request for the transaction in response to confirmation that the transaction measurements satisfy a multi-device authorization policy associated with the transaction. Also in this embodiment, a processor of at least one of the user devices is similarly configured to perform complementary steps that also amount to examples of receiving a request for a transaction requested by a user with whom a plurality of user devices are associated, obtaining respective transaction measurements from at least some available devices from among the plurality of user devices, and confirming approval of the request for the transaction in response to confirmation that the transaction measurements satisfy a multi-device authorization policy associated with the transaction.

Relying Party Systems

Figure 3:
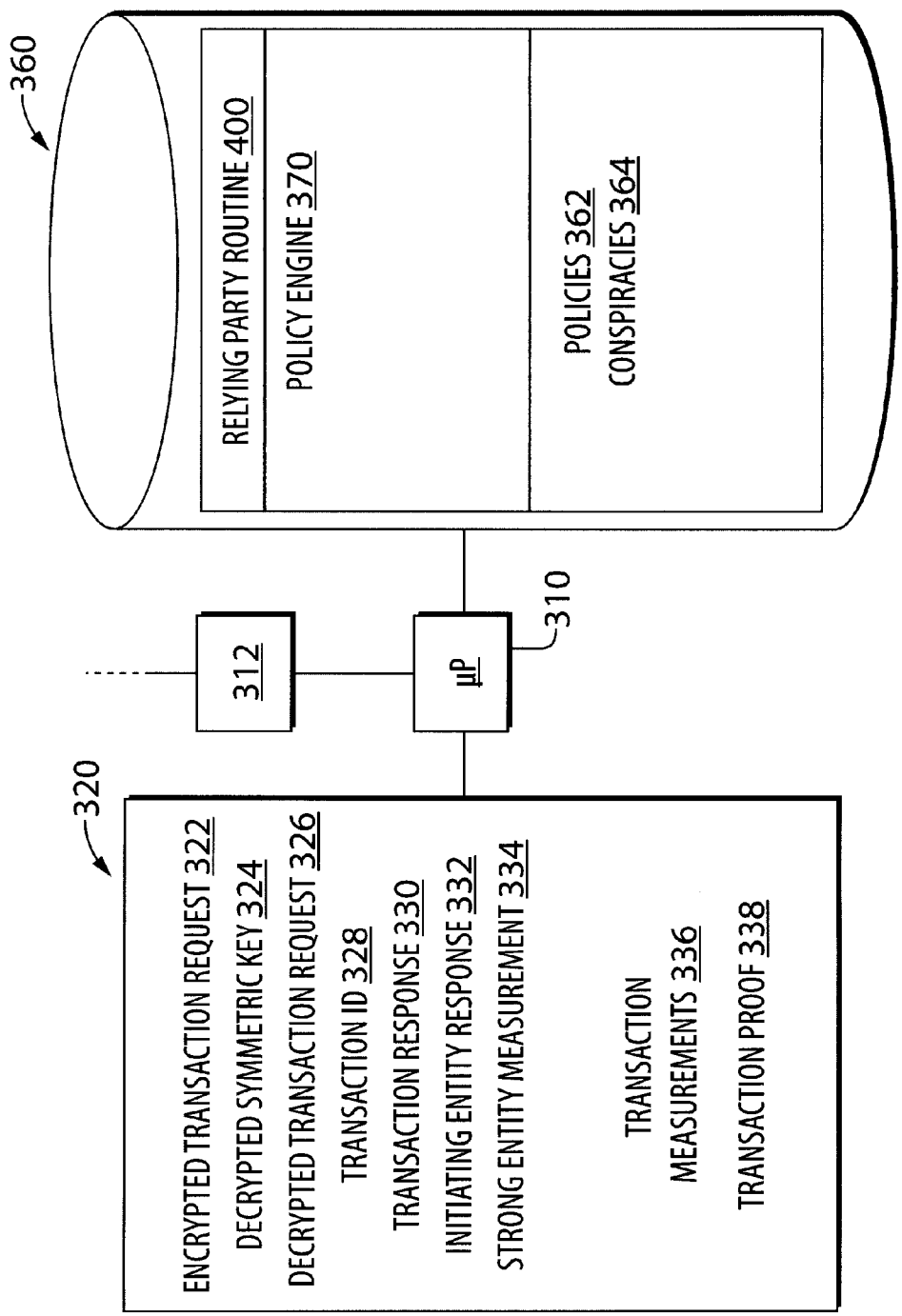
FIG. 3 is a block diagram of a relying party device of the system of FIG. 1.

Referring to FIGS. 1 and 3, the relying party systems are shown generally at 300 in FIG. 1. In this embodiment, the relying party systems 300 include three relying party computer systems 302, 304 and 306, each associated with a different relying party. In general, the relying parties (RPs) are stakeholders who provide services to the particular user, and who aim to achieve an appropriate level of security for authorization of transactions with the user. Thus, the relying parties can include online vendors, credit card companies or other online payment service providers, and can broadly include virtually any organization, such as government institutions, the military, banks, social networking sites, etc. Therefore, in view of the varying nature of the relying parties, the requested transactions with such relying parties may likewise be broadly selected from the group consisting of authentication, authorization and use of a service, a group which encompasses most conceivable online transactions. In this embodiment, strictly by way of example, the relying party computer systems 302, 304 and 306 respectively include a bank server for online banking transactions, a corporate server of the particular user's employer, and a government services server through which the particular user can obtain government services. The relying party system 302 described below is assumed to be typical of the relying party systems, and accordingly the systems 304 and 306 are not specifically described further.

In this embodiment, the relying party system 302 includes a processor 310 in communication with a communications interface 312, which allows it to communicate with at least one of the user devices 200 over the network 102. More particularly, in this embodiment the communications interface 312 includes an Ethernet connection to a router (not shown) in wired communication with the network 102. In this embodiment, the communications interface 312 further includes a Wi-Fi transceiver to allow the processor 310 to wirelessly communicate with the network 102 via a Wi-Fi router (not shown) in communication with the network 102. In this embodiment, the communications interface 312 further includes a local close proximity communications interface, which in this embodiment includes a Bluetooth transceiver compatible with Bluetooth Low Energy (Bluetooth 4.0+) protocols; alternatively, or in addition, the local close proximity communications interface may include a transceiver compatible with Near Field Communication (NFC) or other suitable protocols, and generally enables the processor 310 to communicate over a personal area network. Generally, although such local communications interfaces may be unnecessary for backroom server computers, they can also be advantageously provided for any other relying party computer device that the user or one of the user's devices may be physically approaching when requesting a transaction with the relying party, such as an Automated Teller Machine (ATM) in communication with the bank server, or a computer that can automatically authenticate users as they come into proximity with the computer, for example.

In this embodiment, the processor 310 is in further communication with a Random Access Memory (RAM) 320, and with a computer-readable storage medium 360 which in this embodiment includes a solid state drive (SSD), although other options such as a hard disk drive or a hybrid drive may be substituted.

In this embodiment, the computer-readable storage medium 360 stores various routines for configuring the processor 310 to carry out the various functions of the relying party described herein, including a relying party authorization routine 400 discussed in greater detail below in connection with FIG. 4, and a policy engine 370. In this embodiment, the medium 360 also includes a policies store 362 that stores a plurality of multi-device transaction authorization policies associated with respective transaction types, and a conspiracies store 364 that stores identifications and capabilities of devices that belong to device conspiracies associated with respective users.

In this embodiment, the RAM 320 defines various registers, buffers and stores used by the processor 310 under the direction of the routines stored in the computer-readable storage medium 360, as discussed in greater detail below in connection with the relying party authorization routine 400.

User Devices

In the present embodiment, the plurality of user devices 200 associated with the particular user includes a first user device 202, which in this embodiment is a smartphone, or more particularly an iPhone. The user device 202 includes a processor 210 in communication with a communications interface 211. In this embodiment, the communications interface 211 includes multiple communications interfaces that enable it to communicate with the network 102, including a wireless cellular telephone transceiver and a Wi-Fi transceiver to allow the processor 210 to wirelessly communicate with the network 102 via cellular base stations (not shown) or Wi-Fi routers (not shown) in communication with the network 102. In this embodiment, the communications interface 211 further includes a local close proximity communications interface, which in this embodiment includes a Bluetooth transceiver compatible with Bluetooth Low Energy (Bluetooth 4.0+) protocols; alternatively, or in addition, the local close proximity communications interface may include a transceiver compatible with Near Field Communication (NFC) or other suitable protocols, and generally enables the processor 310 to communicate over a personal area network. Generally, although such local communications interfaces may be unnecessary for backroom server computers, they can also be advantageously provided for any other relying party computer device that the user or one of the user's devices may be physically approaching when requesting a transaction with the relying party, such as an Automated Teller Machine (ATM) in communication with the bank server, or a computer that can automatically authenticate users as they come into proximity with the computer, for example.

In this embodiment, the processor 210 is in further communication with a Random Access Memory (RAM) 220, and with a computer-readable storage medium 260 which in this embodiment includes a solid state drive (SSD).

In this embodiment, the computer-readable storage medium 260 stores various routines for configuring the processor 210 to carry out the various functions of the "initiating entity" which initiates a transaction with the relying party system. More particularly, in this embodiment the computer-readable storage medium 260 stores an initiating entity authorization routine 500 discussed in greater detail below in connection with FIG. 5, a non-initiating entity authorization routine 600 discussed below in connection with FIG. 6, a legacy credentials routine as discussed below in connection with FIG. 7, and a policy engine 270. In this embodiment, the medium 260 also includes an encrypted credentials store 280 for storing encrypted credentials, and a user policies store 290 for storing user-defined multi-device transaction authorization policies. In the present embodiment, the medium 260 further includes an entity identifier store 262 for storing an identifier of the user device 202, a conspiracy identifiers store 264 for storing an identification of the user's device conspiracy, which in this embodiment includes the plurality of user devices 200; and a conspiracy devices store 266 for storing identifications of the plurality of user devices 200 and their attributes, as discussed below in connection with device enrollment.

In this embodiment, the RAM 220 defines various registers, buffers and stores used by the processor 210 under the direction of the routines stored in the computer-readable storage medium 260, as discussed in greater detail below in connection with the initiating entity authorization routine 500, the non-initiating entity routine 600 and the legacy credentials routine 700.

In this embodiment, the plurality of user devices 200 further includes a tablet 204 which in this embodiment is an iPad, a laptop computer 206 and a desktop computer 208. As with the user device 202, in this embodiment each of the tablet 204, laptop 206 and desktop 208 includes a communications interface comprising at least a Wi-Fi transceiver for communication with the network 102, and each further includes a local communications interface which in this embodiment includes a Bluetooth Low Energy (Bluetooth 4.0+) compatible transceiver.

In this embodiment, the plurality of user devices 200 also includes a plurality of Internet of Things (IoT) devices 212 associated with the user. In this regard, the present embodiment advantageously leverages the emerging Internet of Things by using available IoT devices to increase security. In contrast with the current IoT industry's focus upon increasing the inherent security of IoT devices to protect their internally stored information and access to their local networks, the present embodiment can advantageously use one or more IoT devices regardless of their inherent security levels, to enhance the security of a transaction that is unrelated to the IoT devices themselves, by having such devices participate in a device conspiracy. It will be apparent from the following description that each additional device that is added to the conspiracy enhances the security provided by the conspiracy, by imposing an additional need for participation by the additional device. Accordingly, even individual devices that are not secure themselves can add to the security of the conspiracy. Thus, in this embodiment, at least one of the available IoT devices 212 lacks a secure element, and at least one of the available IoT devices 212 lacks a Trusted Platform Module (TPM), yet these deficiencies do not prevent the specific IoT devices that lack these elements from contributing to the security of the device conspiracy.

In this embodiment, the plurality of IoT devices 212 includes at least one wearable device, which in this embodiment includes a smart watch 214; more particularly, in this embodiment the smart watch 214 is an Apple Watch and is associated with the first user device (iPhone) 202. In this embodiment, the plurality of IoT devices 212 also includes numerous additional devices, only two of which are shown at 216 and 218 in FIG. 1 by way of example. Generally, the IoT devices 212 may include an open-ended list of IoT devices associated with the user, such as televisions, personal video recorders, thermostats, smoke alarms, security systems, baby monitors, door locks, garage door openers, smart light bulbs, dimmer switches, pet doors, dish washers, clothes washing machines, dryers, coffee machines, immersion cooking devices, food scales, bathroom scales, heart rate or other activity monitoring devices, or more generally, any existing or future types of IoT devices.

In this embodiment, each of the IoT devices 212 includes a communications interface that allows it to communicate with a "strong entity" device as described below. For most newer IoT devices, the communications interface includes a wireless transceiver system configured for communication via Bluetooth Low Energy (Bluetooth 4.0+) and also configured for communication via Wi-Fi, although some IoT devices may additionally or alternatively include other communications interfaces for other communications protocols such as Near-Field Communication (NFC) or Radio Frequency IDentification (RFID), for example.

With respect to the above term, "strong entity," in this embodiment each of the plurality of user devices 200 is categorized, based upon its communication abilities, into one of the following two types of devices:

"strong entities" are devices that can communicate with any other entity, including directly communicating with the relying party systems 300 over the network 102, as well as communicating with "weak entities" and with other strong entities of the particular user's device conspiracy; and "weak entities" are entities that can only communicate with a strong entity, and thus weak entities can only communicate with the relying party systems 300 indirectly by communicating with a strong entity among the plurality of user devices 200 which in turn communicates with one of the relying party systems 300.

Thus, the user device 202, which in this embodiment is an iPhone, is a strong entity because it can communicate directly with any of the relying party systems 300, whereas the smart watch 214, which in this embodiment is an Apple Watch, is a weak entity because it can communicate with the network 102 and relying party systems 300 only indirectly by invoking the communication capabilities of its associated strong entity, the iPhone (user device 202).

In the present embodiment, it is assumed that all of the plurality of user devices 200 associated with the particular user have established a way to mutually authenticate each other. For example, some devices may establish one to one connections with each other, while others may share public keys (whether ad hoc or via the infrastructural services of a Certification Authority). However, other embodiments do not necessarily require such mutual authentication capability. For example, in some embodiments it suffices for each Entity to be mutually authenticated with either the relying party system RP, or with a strong entity of the user's devices which acts as the initiating entity iEnt for the transaction. Other configurations are also possible, such as mutual authentication within equivalent classes of Entities within the Conspiracy, for example.

In this embodiment, each of the IoT devices 212, and more generally each of the plurality of user devices 200, is configured with a policy language, which in this embodiment is eXtensible Access Control Markup Language (XACML). As discussed below, the policy language is used to express the device's characteristics to a Policy Enforcement Point (PEP) for approval to form a relationship, which can then communicate with a Policy Decision Point (PDP) to form a Dynamic Trust Relationship with a Conspiracy.

In some embodiments, all of the plurality of user devices 200 may be physical hardware devices. Alternatively, in other embodiments, the plurality of user devices 200 includes at least one virtual device. As an example of a virtual user device, virtual authentication devices (VADs) can be defined as non-physical devices that exist in one's personal cloud, which can also participate in the Conspiracy. All the characteristics of secure elements and trusted platform modules in the cloud are available to VADs. An example of this involves Amazon CloudHSM as the root of trust. The VAD is a virtualized instance of a Linux or Android OS that participates in the Conspiracy and can make requests to the Cloud based HSM for isolation of cryptography. An example would be to integrate a VAD into Microsoft Active Directory or AWS IAMS.

As noted above, although not necessarily required in all embodiments, in the present embodiment each of the plurality of user devices 200 is capable of establishing a secure communication channel with each other entity among the plurality of user devices 200. In this embodiment, for a communication channel to be considered "secure," it must possess the following properties:

Strong Mutual Authentication;
Confidentiality protection;
Integrity protection;
Non-replayability;
Perfect forward secrecy; and
Retry attacks resistance.

The present embodiment does not require the non-repudiation property from the secure link itself; rather, this property is guaranteed by the Conspiracy System as a whole, but the Conspiracy system assumes that the aforementioned properties are provided by the communication channels.

The above properties can be achieved in various ways, such as any of the following, for example:
  Using HTTPS for RP and authentication secret for entities;
  Entities can establish shared secrets between each other through the Diffie-Hellman protocol or similar and use them for mutual authentication; or
  Entities may generate a public-private key-pair and share their public key with a central server, so that all other Entities in the Conspiracy may query and then use obtained public keys to verify authentication proofs.

In this embodiment, data encryption in the channel is based on a well known cipher, which in this embodiment includes the Advanced Encryption Standard (AES). The key length and the mode of operation should be chosen carefully. Alternatively, any other suitable existing or future encryption algorithm may be substituted for the AES.

In this embodiment, each of the plurality of user devices 200 is also configured to communicate with the others of the plurality of user devices 200 using a federation protocol, which in this embodiment is the Open ID Connect (OIDC) authentication protocol.

Policy Definition

In this embodiment, the term, "policy" generally refers to a set of requirements that must be satisfied in order for a user's request for a transaction to be authorized.

A Policy's requirements and constraints are expressed through a Policy Language, which both the relying party system and the user device can understand and agree on. Policy Issuers use Policy Language to define transaction policy based on their requirements, considering the context of the transaction. For example, a policy issuer may be able to modify the policy on the fly, if necessary for a given transaction, e.g., if a transaction amount is remarkably larger than usual. In general, anyone can be a policy issuer. For example, an organization might issue a policy for accessing their email services, or a user can define a policy for his devices to access online e-commerce sites.

In this embodiment, the relying party system 302 includes a policies store 362 in its computer-readable medium 360. In this embodiment, the policies store 362 stores a plurality of different policies, each associated with a respective transaction type. Advantageously, in this embodiment the policies stored in the policies store 362 include a novel form of multi-device authorization policy, intended to be satisfied by a conspiracy of devices associated with each user, as discussed in greater detail below.

Although each of the relying party (RP) systems 300 will have its own set of policies for its own transactions, it is also possible for the end user with whom the plurality of user devices 200 are associated to set his or her own user policies for transactions as well, in which case both the relying party policy and the user policy must be satisfied for the transaction to proceed.

In this embodiment, as discussed below in connection with the relying party authorization routine 400 and the initiating entity authorization routine 500, when the user uses one of the plurality of user devices 200 to request a transaction with one of the relying party systems 300, a "transaction measurement" (or "TMeas") is solicited from each of the available user devices 200 that can potentially contribute to satisfying the policy. The term "transaction proof" (or "TProof") refers to the set of transaction measurements obtained from the available user devices 200, which can be tested against the policy to determine whether the policy has been satisfied.

Bearing those terms in mind, in this embodiment, a particular policy can impose constraints or conditions relating to the overall "transaction proof" (TProof), or relating to a specific transaction measurement (TMeas), or both. For example, it might be required that within the whole TProof, at least one entity must use a fingerprint scanner to provide its TMeas; or a policy might state that all TMeas must be submitted only by devices that have Intel Software Guard Extensions (SGX) or Trusted Platform Module (TPM) attributes.

In this embodiment, the multi-device authorization policy is defined using at least one Boolean expression. More particularly, in this embodiment the Boolean expression includes at least one disjunctive condition. More particularly still, the present embodiment employs a Policy Language to support the disjunction of sub-policies. This advantageously allows the user or the user's initiating entity to select one of the sub-policies it wants to satisfy (based on context). For example, one of the conditions specified in a relying party's policy for a particular transaction might require either (a) at least one transaction measurement generated using a biometric scanner; or (b) transaction measurements from at least three user devices, so that the requirement for a biometric scan is waived if three or more of the user's conspiracy devices participate in the authorization. Disjunctive conditions also advantageously allow the policy to include an "any of" criterion.

In this embodiment, the Boolean expression further includes at least one conjunctive condition. Accordingly, in this embodiment the Boolean expression of each policy stored in the policies store 362 can include any desired combination of conjunctive and disjunctive conditions, and can also include other Boolean conditions (e.g. negation conditions). Such conditions may be imposed by defining the devices from which a predefined number of transaction measurements must be received. This can be achieved by specifying a required device communication type (e.g. strong or weak entity) and sub-type (e.g. smart phone, smart watch, tablet, etc.), or by specifying particular uniquely identified devices, or by specifying a specific attribute that the device must have, for example. Advantageously, very complex authentication policy conditions can, in this way, be fulfilled, at the cost of some additional complexity. For instance, it is possible for a policy to specify conditions such as the following, including disjunctive statements, requiring transaction measurements to be successfully obtained from:
  any 3 devices belonging to the conspiracy; or
  any 2 devices, plus one with a secure element; or
  4 particular devices; or
  2 particular devices from Conspiracy A along with a secure element from Conspiracy B.

Regarding the term "secure element" in the above passages, in the present disclosure this term is used in a restrictive sense to mean only those secure element features that are useful to the present embodiment, in the sense that they can be exploited to enhance transaction security of a conspiracy of devices. For example, a Trusted Platform Module (TPM) that only attests to a boot sequence of an OS is not considered to constitute a "secure element" for the purpose of the present embodiment, because it provides no services the relying party and is not consultable by the user's device conspiracy. On the other hand, if a TPM in a computer running Windows 10 is able to provide cryptographically signed attestations via Microsoft Passport that a valid biometric has been presented to the computer by the user via Microsoft Hello, then the TPM in that computer is considered to be a secure element and would be an excellent candidate for inclusion in the user's Conspiracy. Generally, if a secure element is present and available, then it is advantageous for entities in the conspiracy to strive to offload as many cryptographic operations to the secure element as possible. In addition, if the SE has storage capabilities, then the entity's key pair may be stored there, and used from this location by the SE itself. In cases when the secure element (e.g., Intel Software Guard Extensions (SGX) does not have storage facilities but has an embedded key, the embedded key may then be used to protect all key material stored on the common storage. The secure element receives encrypted key material, decrypts it inside and uses it as instructed.

In this embodiment, policy is validated by policy decision points (PDP) and enforced by policy enforcing points (PEP), which comprise the Policy Engine (PE). In this regard, in the present embodiment, each entity involved in a conspiracy, including each of the plurality of user devices 200 and each of the relying party systems 300, executes a Policy Engine (PE), such as the policy engines as defined in IETF RFC 2904—AAA Authorization Framework, for example. As with typical modern policy engines, the policy engines of the present embodiment integrate into Enterprise Mobility Management (EMM) platforms for smartphones, tablets and personal computers where, once registered, the EMM can push policies down to the end devices for security and authentication related configuration management.

In this embodiment, different policies may be defined for different transaction types and sub-types. For example, the enterprise that issued the user's credentials might have policies including the following:
  Require strong entity (hardware-based) authentication at least once per session for all transactions;
  Require strong entity authentication for all download transactions;
  Require biometric authentication for any transaction including download of assets tagged "confidential"; and
  Disallow all download transactions of assets tagged "secret".

In this embodiment, each policy can be implemented as a finite state machine, in which case a successful operation is one that can find a progression of states from the start state of each policy to the end state of each policy. Alternatively, any other suitable way of implementing a policy may be substituted. For example, one alternative embodiment employs a Boolean Satisfiability Problem Solver (also known as a "sat solver") instead of a finite state machine. In this regard, Boolean Satisfiability Problems are generally known in the field of computer science (see e.g. https://en.wikipedia.org/wiki/Boolean_satisfiability_problem as of Jan. 20, 2016). In such an embodiment, appropriate values for the variables in the Boolean expression may be provided, and the Boolean expression is ultimately tested as to whether it is true or false. The transaction is authorized if and only if the Boolean expression is true.

In the present embodiment, policies can also include conditions imposed not only upon attributes of individual devices that belong to the Conspiracy, but also upon characteristics of the Conspiracy itself, such as the following examples:
  conspiracy size and formation date;
  duration (e.g., expires after 12 months);
  history of devices (i.e., dates of device additions to/removals from conspiracy); and
  Security Assurance Level (SAL), a strength metric useful to the organization, as discussed below in connection with device enrollment; for example, a policy may include a requirement that the SAL of the user's device conspiracy be at least a threshold value, failing which the policy will not be satisfied and the transaction request will be refused.

Enrollment and Conspiracy Definition

In this embodiment, each of the plurality of user devices 200 is enrolled in a device conspiracy list associated with the user, which generally lists the user devices 200 and their respective attributes. However, although such a conspiracy set list is maintained at both the relying party and the first user device 202 in the present embodiment, other embodiments may omit such lists and instead rely upon ad hoc identification by a strong entity of the various other user devices 200 that are available to participate in the transaction, each time that strong entity initiates a transaction with a relying party. Such alternative embodiments are discussed briefly below in the "Alternatives" section near the end of the present disclosure.

In this embodiment, a list of the plurality of user devices 200 and their attributes is maintained at the relying party system 302 in a conspiracies store 364. In this embodiment, this list is synchronized with a similar list maintained at the user device 202 in a conspiracy devices store 266. In this embodiment, either the relying party system 302 or the user device 202 may edit the list to change the composition of the user's device conspiracy, although if desired such administrative authority may be restricted to one of the two parties.

In the present embodiment, when one of the plurality of user devices 200 joins the user's conspiracy, it is assigned a new entity identifier (EID) that is unique within the conspiracy. In addition, a conspiracy identifier (CID) acts as a universally unique identifier to identify this particular device conspiracy among other device conspiracies. Accordingly, the combination, or more particularly the concatenation, of the conspiracy identifier (CID) and the entity identifier (EID), produces a universally unique identifier of an entity, referred to herein as the CEID. In this embodiment, each entity among the plurality of user devices 200 that has storage capability locally stores at least its entity identifier EID and the conspiracy identifiers CIDs of one or more conspiracies in which the user device is enrolled; for example, the first user device 202 stores its own EID and CID values in an entity identifier store 262 and a conspiracy identifiers store 264. In addition, these EID and CID values are also stored in the record for the user device in the conspiracy devices store 266 of the user device 202, and in the duplicate record for that user device in the conspiracies store 364 of the relying party system 302. The CEID value may optionally be included in these records, if desired, although alternatively it may simply be reconstructed by concatenating CID and EID whenever needed.

In this embodiment, each entity upon joining a conspiracy provides its own security-relevant attributes, which are recorded in a plurality of respective attribute fields of the record for the entity in the conspiracy devices store 266 and in the duplicate record in the conspiracies store 364. In this regard, each entity, upon registration, provides a list of its attributes which specify its capabilities. When required, an attribute list might also include publicly shared authentication information, which allows the authentication of a sub-system of the device. For example, a personal computer having a CPU with Software Guard Extensions (SGX)

capabilities may expose the public key of that CPU as an attribute, so that the secure container can be authenticated.

In the present embodiment, by way of example, the attribute fields of each device record in the conspiracy devices store 266 and in the conspiracies store 364 include fields for at least the following attributes:

Strong/weak entity communication status, indicating whether able to communicate directly with relying party;

Secure element status: whether the device includes a secure element;

Cryptographic capabilities;

Physicality/virtuality status: whether the device is a physical hardware device as opposed to a cloud-based or other virtual device;

Message capabilities: ability to display or otherwise convey a message to the user;

Storage capabilities: whether storage is available, whether secure, how much storage space is available;

Specific communications capabilities: if desired, a plurality of binary flags or larger attribute fields may be provided to indicate availability of common communication protocols, including Bluetooth Low Energy (BLE, i.e. Bluetooth 4.0+), Bluetooth, Wi-Fi, ZigBee, etc.

The above attributes are merely examples. If desired, a virtually inexhaustible supply of different attributes deemed relevant may be included in the record for each device in the conspiracy devices store 266 and in the conspiracies store 364.

As noted above in connection with policy definitions, in this embodiment policy is validated by policy decision points (PDP) and enforced by policy enforcing points (PEP), which comprise the Policy Engine (PE) executing on each of the user devices 200. In a PDP associated with a Conspiracy, the initiating entity (iEnt), which in general is the strong entity that initiates a request for a transaction with one of the relying party systems 300 and which in the present embodiment is the first user device 202, is aware of the number of devices in the Conspiracy. In this embodiment, a Security Assurance Level (SAL) is constantly tracked for the Conspiracy through operational changes to the user devices involved.

In this embodiment, there are a number of factors that determine a given device's contribution to the conspiracy's SAL score:

Whether the device is correctly enrolled in the Conspiracy;

Availability of hardware security such as Secure Elements, Trusted Execution Environments, etc.

whether PIN, password lock, biometrics, and data encryption are enabled;

whether biometric security is integrated;

Attestation of the integrity of the Operating System through TPM; and

OS version, device model, etc.

Other embodiments may omit or modify the above factors and may also consider additional factors. For example, in one embodiment user devices are categorized into tiers, based on their inherent security features. In such an embodiment, the policy may be defined using the tiers: for example, a given policy might require authorization in the form of transaction measurements from at least two Tier 1 devices and from at least one Tier 2 device.

In the construction phase of the Conspiracy, the initial SAL is calculated. Deviation from the initial SAL is determined based on a number of statistical models to allow for operation changes. For smart devices such as smartphones and tablets, operational changes such as mobile OS revisions are factored into the SAL. In this embodiment, the policy engines 270 and 370 include an Intelligent Agent subroutine, which recalculates the SAL score of a conspiracy, either continuously, or periodically for example, or reactively when a request for a transaction has been received from one of the devices of the conspiracy.

In this embodiment, the Intelligent Agent subroutine directs the processor 210, or alternatively the processor 310, to continuously or periodically analyze the state of the user devices registered with the policy engine. The intelligent agent:

receives information on each device's monitoring agent determines the state of the devices attests to the integrity of the Shares in the Conspiracy in the case of a virtual authentication device (VAD), sends instructions to the virtual device manager to activate/deactivate based on the current state of the VAD.

In the policy engine, if the Intelligent Agent PEP deems that a device has been compromised, in this embodiment the PEP removes the device and Shares from the conspiracy. The validity of the shares can be determined by attestation to the measured values and destroyed if necessary; this is only used in specific environments that need this level of assurance.

Where a user device is a wearable computer such as a Smart-watch, the policy engine can utilize Continuous Authentication techniques to validate that the end user is indeed wearing the computer device. The Intelligent Agent PDP uses artificial intelligence or machine learning methods to continually determine the health status of the devices. The intelligent agent uses active learning to interactively obtain data from the system manager to make decisions on the device being worn by the user.

In enterprise environments, a System Manager and Intelligent Agent monitor the health of the trusted devices associated with a user. Techniques such as behavioural & anomaly detection can be utilized to determine if one of the devices becomes untrusted.

Returning to the Security Assurance Level (SAL) of the user's device conspiracy, in this embodiment, the Policy Decision Point (PDP) may reject any authentication or authorization if the SAL falls below a threshold value. The PDP may force the user into a "Guest Mode" with reduced privileges, which would require the user to add more devices to the conspiracy to increase its SAL back above the minimum required threshold.

In this embodiment, enrolment of a new device into the user's device conspiracy is permitted any time. In this embodiment, the device conspiracy is also scalable, insofar as the addition of a new device to the conspiracy does not require the new device to be paired with every other member of the device conspiracy.

Relying Party Authorization Routine

The relying party authorization routine 400 and the initiating entity authorization routine 500 discussed below provide specific examples of illustrative embodiments of the present invention. However, these illustrative embodiments are not to be construed as limiting the invention as defined by the accompanying claims, since other ways of embodying the present invention will become apparent to those skilled in the art upon review of the present specification.

Figure 4:
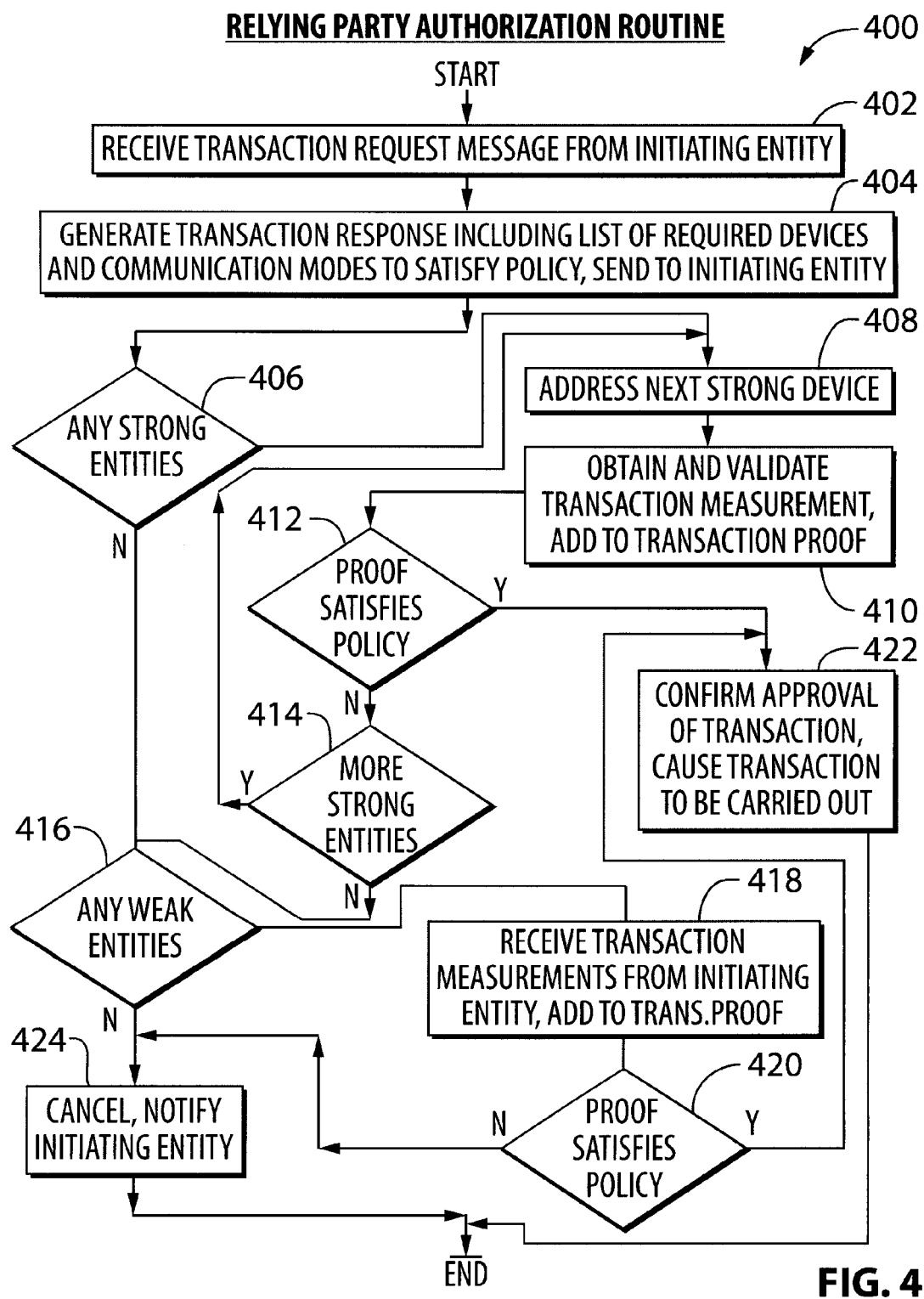
FIG. 4 is a flow chart of a relying party authorization routine executed by the relying party device of FIG. 3.

Referring to FIGS. 3 and 4, the relying party authorization routine is shown generally at 400 in FIG. 4. Generally, in this embodiment the relying party authorization routine 400 directs the processor 310 of the relying party system 302 to receive a request for a transaction requested by a user with whom a plurality of user devices are associated, to obtain respective transaction measurements from a plurality of available devices from among the plurality of user devices, and to confirm approval of the request for the transaction in response to confirmation that the transaction measurements satisfy a multi-device authorization policy associated with the transaction.

In this embodiment the relying party authorization routine 400 begins with a first block 402 of codes, which directs the processor 310 of the relying party system 302 to receive a request for a transaction requested by a user with whom a plurality of user devices are associated. More particularly, block 402 directs the processor 310 to achieve this by receiving a transaction request message from the first user device 202 acting as an initiating entity, the transaction request message being constructed as discussed below in connection with block 504 of the initiating entity authorization routine 500. Thus, in this embodiment block 402 directs the processor 310 to receive a transaction request message of the following form:

$$IM = CEID \| C \| Sig \| EK$$

where:
∥ denotes a concatenation operation;
CEID=the concatenation of the Conspiracy ID (CID) with the Entity ID (EID) of the initiating entity;
C=E(K, Treq) is an authenticated encryption of the requested transaction details Treq, encrypted using the symmetric key K;
Sig=S(IPriv, K∥Treq) is the signature produced with the initiating entity's private key IPriv of the concatenation of the symmetric key K with the requested transaction details Treq; and
EK=E(RPub, K) is the encryption of symmetric key K using the relying party device's public key RPub.

In this embodiment, block 402 directs the processor 310 to save the received message IM in an encrypted transaction request store 322 in the RAM 320. Block 402 then directs the processor 310 to decrypt the symmetric key K, by performing the following decryption operation to the key encryption portion EK of the received message IM:

$$K = D(RPriv, EK)$$

where D=D(RPriv, EK) is the decryption of EK (defined above) using the relying party device's private key RPriv. Block 402 directs the processor 310 to store the decrypted symmetric key K in a decrypted symmetric key store 324 in the RAM 320.

Block 402 then directs the processor 310 to use the decrypted symmetric key K to decrypt the request message Treq by performing the following decryption operation to the authenticated encryption portion C of the received message IM:

$$Treq = D(K, C)$$

where D=D(K, C) is the decryption of C (defined above) using the symmetric key K. Block 402 directs the processor 310 to store the decrypted transaction request message Treq in a decrypted transaction request store 326 in the RAM 320.

In this embodiment, block 402 then verifies the authenticity of the received transaction request message, by performing the following verification operation:

$$V(IPub, K \| Treq, Sig)$$

where:
IPub is the initiating entity's public key;
K is the now decrypted symmetric key stored in the decrypted symmetric key store 324;
Treq is the now decrypted transaction request message stored in the decrypted transaction request store 326;
Sig is the signature portion of the received transaction message IM stored in the encrypted transaction request store 322 (Sig=S(IPriv, K∥Treq), the signature produced with the initiating entity's private key IPriv of the concatenation of the symmetric key K with the request message Treq).

If any aspect of the verification process fails, e.g. if the authenticated encryption C is not valid, or if the signature Sig is not valid, then block 402 directs the processor 310 to terminate the transaction and notify the initiating entity accordingly. Otherwise, if the verification operation is successful, block 402 directs the processor 310 to generate a transaction reference number TransID and store it in a Transaction ID register 328 in the RAM 320.

In this embodiment, block 404 then directs the processor 310 to inform the user device 202 of a multi-device authorization policy that must be satisfied for the transaction to be approved. More particularly, in this embodiment block 404 directs the processor 310 to generate and transmit to the initiating entity, which in this embodiment is the first user device 202, a transaction request response TResp defining the multi-device authorization policy for the transaction. To achieve this, block 404 first directs the processor 310 to examine the transaction policy information stored in the policies store 362 in the storage medium 360, to identify the user devices or types of user devices from which transaction measurements can be obtained in order to satisfy the policy and proceed with the transaction. Block 404 directs the processor 310 to specify at least the following information in the response message TResp for each device that can potentially contribute to the authorization of the transaction: (1) the user device type or attribute (which may optionally include the unique ID of a specific device); (2) whether the transaction measurement is to be obtained through direct communication between the user device and the relying party device, or indirectly through the initiating entity; and (3) whether at least one user device is required to obtain user interaction before transmitting its transaction measurement, or whether the transaction measurement is to be obtained automatically.

With respect to item (1) above, in this embodiment the transaction policy can specify a requirement for authorization from a particular type of user device, or from a device having a particular type of attribute, without necessarily identifying a specific user device. For example, a given policy might require authorization from at least one smartphone, or from at least one device having a secure element, or from at least one device having a Trusted Platform Module (TPM). As a further example, if the transaction relates to a joint account, or if joint authorizations of the user and another user are otherwise required for the transaction, then the policy for the transaction may require authorization from at least device associated with the other joint user. In this regard, although the plurality of user devices 200 normally consists of devices that are directly associated with the same particular user, it may also include devices that are indirectly associated with the particular user, such as a device that is directly associated with a second user, who in turn is associated with the particular user through their shared joint account. Alternatively, the policy may require authorization from a specific, uniquely identified user device, and as discussed below, generic requirements (i.e. requirements for authorization from a particular type or class of device or from a device having a certain attribute) may be combined with specific requirements for authorization from one or more uniquely identified specific devices, if desired.

With respect to item (2) above, in this embodiment the various user devices in a conspiracy are categorized as either "weak entities" meaning those that can only communicate via an initiating entity, or "strong entities" meaning those that can communicate directly with the relying party or with any other entity. As discussed in greater detail below in connection with blocks 408 and 410, in this embodiment the processor 310 of the relying party can obtain transaction measurements directly from any "strong entities" among the set of required user devices, but only the initiating entity iEnt can communicate with the "weak entities" to obtain their transaction measurements.

With respect to item (3) above, some transaction policies may require a positive affirmation from the user through user interaction. As a simple example, the user may be prompted to "confirm" or "reject" the transaction by actuating virtual buttons displayed on a display of the device.

In this embodiment, block 404 also directs the processor 310 to include, in the transaction response message TResp, a logical expression (e.g., a Boolean logic expression) which effectively defines the policy, by defining which combination or combinations of the specified device types and specific devices can satisfy the policy. In a simple example, one such policy would include a condition that requires transaction measurements to be successfully obtained from at least a minimum number m out of a total of n user devices 200. In another example, the policy would require the same minimum number m of transaction measurements, but would also apply a second conjunctive condition requiring respective transaction measurements to be transmitted directly to the relying party system 302 from at least a minimum number s ($1 \leq s \leq m$) of "strong" devices that can communicate directly with the relying party system 302. Additionally or alternatively, some policies may require devices with specific attributes (e.g. secure element or TPM) or specific uniquely identified user devices to be among the available devices used for authorization. As a further example, as noted above, in embodiments requiring joint authorization of two or more users, the policy may specify mandatory transaction measurements to be obtained from both a device of the main user and from a different device of a second user with whom the main user is associated (e.g., where the two users are the holders of a joint bank account). More generally, in this embodiment the logical expression included in the transaction response message TResp, which defines the transaction policy, can require any desired combination or combinations of devices deemed to be sufficiently reliable when authenticated together. The combination or combinations that will satisfy the policy are, in general, specified by the logical expression which can include any desired combination of conjunctive, disjunctive or other logical conditions that the transaction measurements must satisfy.

In this embodiment, block 404 directs the processor 310 to construct and store the transaction response message TResp in a TResp field of a transaction response store 330 in the RAM 320.

Once the transaction ID TransID and the transaction response message TResp have been generated and stored in the RAM 320, block 404 then directs the processor 310 to generate two signatures, namely, a transaction request signature RSig and a transaction response signature APSig, as follows:

$$RSig=S(RPriv,TReq);$$

and $$APSig=S(RPriv,TResp).$$

where:
S(RPriv, TReq)=the signature of the decrypted transaction request message TReq using the relying party's private key RPriv; and
S(RPriv, TResp)=the signature of the transaction response message TResp using the relying party's private key RPriv.

Block 404 then directs the processor 310 to assemble an initiating entity response message, as follows:

$$RM=TransID\|TResp\|RSig\|APSig$$

where ∥ denotes a concatenation operation, TransID and TResp are the contents of the transaction ID register 328 and the transaction response store 330 respectively, and RSig and APSig are the signatures generated immediately above at block 404. Block 404 directs the processor 310 to store the resulting initiating entity response message in an initiating entity response store 332 in the RAM 320. In this embodiment, block 404 further directs the processor 310 to transmit the initiating entity response message to the initiating entity. As discussed below, the initiating entity will then react to the response message by communicating with each of the available "weak" devices (devices that can communicate only via the initiating entity) to obtain their transaction measurements.

However, in this embodiment, if the user's device conspiracy set includes one or more "strong" devices (devices that can communicate directly with the relying party or other entities), which can potentially satisfy one or more conditions of the transaction policy, then the relying party will contact those strong devices directly to obtain their transaction measurements. To achieve this, in this embodiment block 406 directs the processor 310 to determine whether the definition of the user's conspiracy set for the transaction, represented by the records corresponding to the current user in the conspiracies store 364, identifies any of the user's devices which are "strong" entities and whose attributes satisfy at least one requirement of the policy. If so, then in this embodiment blocks 408 and 410 configure the processor 310 of the relying party system 302 to directly receive or obtain at least one of the transaction measurements from at least one available device of the plurality of user devices; preferably, at least some transaction measurements are obtained from at least some of the available devices. To achieve this, in this embodiment blocks 408 and 410 direct the processor 310 to request a transaction measurement from each such strong entity having an attribute satisfying a policy requirement, in successive repetitions of these blocks. To do so, block 408 first directs the processor 310 to address the next new "strong" device in the user's conspiracy set having an attribute satisfying a requirement of the policy, from which a transaction measurement has not yet been obtained.

In this embodiment, block 410 then directs the processor 310 to obtain and validate a transaction measurement from the currently addressed strong user device. To do so, block 410 first directs the processor to assemble a strong entity transaction measurement request message, as follows:

$$TransID\|TResp\|RSig\|APSig\|TReq$$

where TReq denotes the contents of the decrypted transaction request store 326, which are effectively concatenated to the contents of the initiating entity response store 332 to form the strong entity transaction measurement request message. Block 410 directs the processor 310 to store the resulting concatenated message in a strong entity transaction measurement request store 334 in the RAM 320, and further directs the processor to transmit the message to the currently addressed strong entity.

In this embodiment, block 410 then directs the processor 310 to obtain the transaction measurement for at least one of the user devices by obtaining a digital signature capable of being validated by at least the relying party system 302, and further configures the processor 310 of the relying party system to validate the digital signature. To achieve this, block 410 directs the processor 310 to receive the requested transaction measurement from the currently addressed strong entity, and to store it in a transaction measurements store 336 in the RAM 320. More particularly, in this embodiment the transaction measurement message EM received from the currently addressed strong entity is as follows:

$$EM = CEID \| TransID \| TSig$$

where:
CEID=the concatenation of the Conspiracy ID (CID) with the currently addressed strong entity's entity ID (EID);
TransID=the contents of the transaction ID register 328;
TSig=S(EPriv, (TransID∥RSig∥TReq))=signature of (TransID∥RSig∥TReq) with the strong entity's private key EPriv, where RSig is as discussed above at block 404, and where TReq is the contents of the decrypted transaction request store 326.

In the present embodiment, each time block 410 is executed, a new transaction measurement from a new respective strong device is obtained and appended to the contents of the transaction measurements store 336, which in this embodiment act as a transaction proof 338. The transaction proof 338 is thus constructed by appending successive transaction measurements from qualified available strong devices at block 410, as well as from weak devices as discussed below in connection with block 418.

In this embodiment, block 410 further directs the processor to validate the received transaction measurement message, by validating the signature TSig using the strong entity's public key EPub, to ensure that the signature was in fact generated with the strong entity's private key EPriv.

Alternatively, if no transaction measurement is received from the currently addressed strong device within a predefined timeout period, the currently addressed strong device is deemed to be unavailable. In that case, block 410 directs the processor 310 to address the next strong device of the user's conspiracy set and to obtain a transaction measurement therefrom in the manner described above.

In the present embodiment, block 412 then directs the processor 310 to determine whether the requirements of the transaction policy have been satisfied. In this regard, block 412 directs the processor 310 to compare the transaction measurements stored in the transaction measurements store 336 to the requirements of the transaction policy stored in the policies store 362.

In this embodiment, if at block 412 it is determined that the logical requirements of the policy have been satisfied by the transaction measurements, then processing continues at block 422, which directs the processor 310 to confirm approval of the transaction. More particularly, in this embodiment block 422 directs the processor to confirm approval of the transaction in two ways, namely, by generating and transmitting to the initiating entity a transaction approval message indicating that the transaction measurements satisfy the multi-device authorization policy associated with the transaction and that the transaction is therefore approved, and by then causing the transaction to be carried out. For example, if the requested transaction is an online bank transfer from the user's account to Recipient X and the relying party is a bank, then block 422 directs the processor 310 to notify the initiating entity that the transfer request has been approved, and then further directs the processor to carry out the requested fund transfer transaction by transferring the funds as requested by the user.

Otherwise, if at block 412 it is determined that the requirements of the transaction policy have not yet been satisfied, block 414 directs the processor 310 to determine whether there are any other strong entities from which transaction measurements have not yet been obtained, other than those that were deemed unavailable at block 410. To achieve this, in this embodiment block 414 directs the processor to determine whether the conspiracies store 364 contains identifications of any "strong" user devices for which a corresponding transaction measurement has not yet been obtained and stored in the transaction measurements store 336, other than devices identified as unavailable at block 410. If so, then the processor is directed back to blocks 408 and 410 to continue addressing and obtaining transaction measurements from each strong entity, until either it is determined at block 412 that the policy has been satisfied or it is determined at block 414 that there are no more strong devices from which transaction measurements can be obtained.

If it has been determined at block 412 that the transaction proof (consisting of the obtained transaction measurements) does not yet satisfy the transaction policy and it has been determined at block 414 that there are no more available "strong" devices that the relying party can communicate with directly to obtain transaction measurements, block 416 directs the processor 310 to determine whether there are any "weak" devices that can contribute to the transaction proof to satisfy the policy for the transaction. To achieve this, in this embodiment block 416 directs the processor to determine whether the user's conspiracy set definition, represented by the contents of the records corresponding to the current user in the conspiracies store 364, contains identifications of any "weak" user devices, i.e., devices that can directly communicate with an initiating entity but cannot directly communicate with a relying party. If not, then since all strong devices have already been polled for their transaction measurements at blocks 408 to 412 above without satisfying the policy, it follows that the policy cannot be satisfied in this instance, and block 424 directs the processor 310 to cancel the transaction and notify the initiating entity.

Otherwise, if at block 416 it is determined that the user's device conspiracy set includes one or more "weak" entities that can contribute to the transaction proof, then in this embodiment block 418 directs the processor 310 of the relying party system 302 to receive, from the first user device 202, the transaction measurement of at least one available device of the plurality of user devices 200 other than the first user device 202; preferably, the processor 310 is directed to receive at least some transaction measurements from at least some of the available user devices. More particularly, in this embodiment block 418 directs the processor 310 to receive the transaction measurements of the weak entities among the plurality of user devices 200 from the initiating entity (in this case the first user device 202), and to append them to the contents of the transaction measurements store 336. In this regard, as discussed below in connection with the initiating entity authentication routine, after the initiating device receives the relying party's transaction response message generated at block 404 above, the initiating entity polls the various weak entities for their transaction measurements at block 516 below in the same way as the relying party polls the strong entities as described above at blocks 408 and 410, and sends the acquired weak entity transaction measurements to the relying party at block 524 below.

After receiving the weak entity transaction measurements at block 418 and storing them along with the strong entity transaction measurements, block 420 directs the processor 310 to re-evaluate whether the weak and strong entity transaction measurements stored in the transaction measurements store 336 satisfy the policy, in the same manner as discussed above at block 412.

In this embodiment, if at block 420 it is determined that the transaction measurements received from the user device 202 in respect of weak entities, and the transaction measurements obtained directly from strong entities, satisfy the multi-device authorization policy for the transaction, then block 422 directs the processor 310 to approve the request for the transaction, confirm approval to the user device 202 and cause the requested transaction to be carried out, as discussed in the more detailed discussion of block 422 earlier herein. Alternatively, if the received transaction measurements do not satisfy the policy, then block 424 directs the processor 310 to cancel the transaction and notify the initiating entity.

Although blocks 418 and 420 refer to receiving all of the transaction measurements for weak entities from the initiating entity and evaluating whether the policy has been satisfied after all weak entity transaction measurements have been received, if desired block 420 may be modified to evaluate whether the policy is satisfied after receipt of each successive weak entity transaction measurement, and if not then to continue redirecting the processor back to block 418 to continue receiving new weak entity transaction measurements until either the policy is satisfied or transaction measurements have been received from all weak entities.

Following execution of block 422 or 424, the relying party authorization routine 400 is then ended.

Initiating Entity Authorization Routine

In this embodiment, it is assumed that the first user device 202 acts as the "initiating entity" iEnt for the requested transaction. In this regard, the Initiating Entity (iEnt) is the Entity a user has selected to use as the main device for the transaction. That is, the transaction-related information is typed and displayed at that device. In this embodiment, any device among the plurality of user devices 200 can be selected as the iEnt, as long as it has all the affordances required to facilitate the contemplated transaction. For example, a user might prefer a smartphone to pay for merchandise in a shop, but when in their own home the user may use a desktop/laptop for online shopping.

Figure 2:
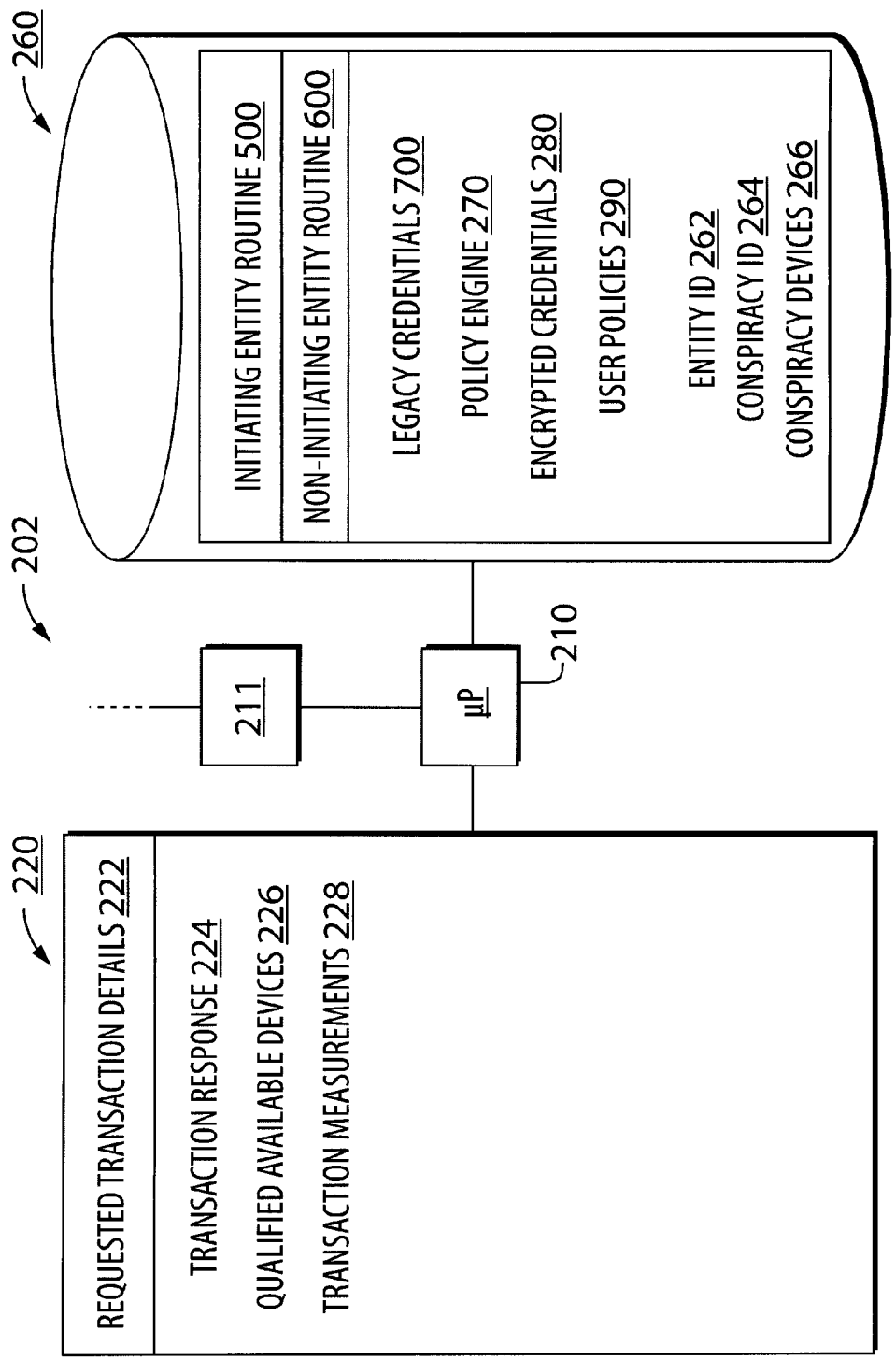
FIG. 2 is a block diagram of a user device of the system of FIG. 1.
Figure 5:
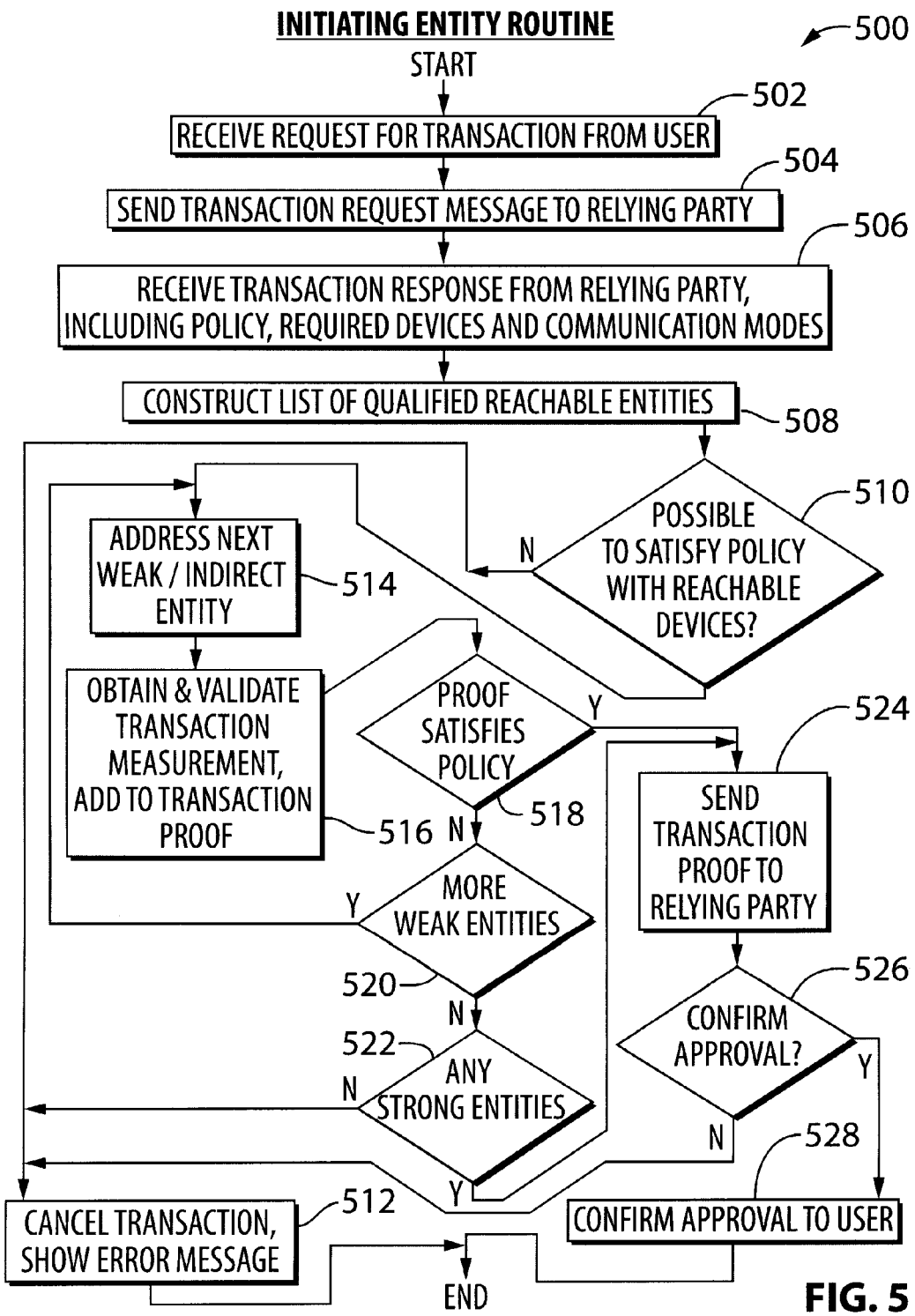
FIG. 5 is a flow chart of an initiating entity authorization routine executed by the user device of FIG. 2.

Referring to FIGS. 2 and 5, the initiating entity authorization routine is shown generally at 500 in FIG. 5. Generally, in this embodiment the initiating entity authorization routine directs the processor 210 of the first user device 202 to receive a request for a transaction requested by a user with whom a plurality of user devices are associated, to obtain respective transaction measurements from a plurality of available devices from among the plurality of user devices, and to confirm approval of the request for the transaction in response to confirmation that the transaction measurements satisfy a multi-device authorization policy associated with the transaction.

In this embodiment, the initiating entity authorization routine 500 begins with a first block 502 of codes, which directs the processor 210 to receive a request for a transaction requested by a user with whom a plurality of user devices are associated. In the present embodiment, the user device 202 including the processor 210 is the initiating device for the transaction, and thus receives the request for the transaction directly from the user. To achieve this, block 502 directs the processor 210 to prompt the user to enter details defining the requested transaction, and configures the processor 210 to receive a request for a transaction by receiving user input from the user at the first user device 202 in response to such prompting. More particularly, in this embodiment block 502 directs the processor 210 to prompt the user to enter details of the subjects, objects and properties of the transaction.

For example, where the requested transaction is an electronic money transfer of $1,000 from the user's account to Recipient X, the subjects would be the user and Recipient X, the object would be a money transfer, and the property would be $1,000. Alternatively, the requested transaction need not be financial. Instead, the requested transaction may be a request for access to a confidential company document, for example. Alternatively, the transaction could be a request to change access privileges: e.g., if the user needs to grant an employee access to secret documents for a particular project, the subject would be the employee's name (or employee ID, etc.), the object would be "access to secret documents", and the property would be "grant". More generally, in this specification including the claims, the term, "transaction" is intended to broadly encompass any act requested by a user, for which electronic authentication or authorization of the user is required.

In this embodiment, block 502 directs the processor 210 to store the transaction details entered by the user in a requested transaction details store 222 in the RAM 220, and to prompt a user to actuate a "Commit" button displayed on the user device 202 to thereby commit to the requested transaction.

Block 504 then directs the processor 210 to generate and transmit a transaction request message to the processor 310 of the relying party system 302. More particularly, in this embodiment block 504 first directs the processor 210 to generate a random symmetric key K. Block 504 then directs the processor 210 to generate the transaction request message discussed above in connection with block 402 of the relying party authorization routine 400, as follows:

$$IM=CEID\|C\|Sig\|EK$$

where:
∥ denotes a concatenation operation;
CEID=the concatenation of the Conspiracy ID (CID) with the Entity ID (EID) of the initiating entity, i.e., the concatenated contents of the conspiracy identifiers store 264 and the entity identifier store 262;
C=E(K, Treq) is an authenticated encryption of the transaction request details Treq stored in the requested transaction details store 222, encrypted using the random symmetric key K;
Sig=S(IPriv, K∥Treq) is the signature produced with the initiating entity's private key IPriv of the concatenation of the symmetric key K with the transaction request details Treq stored in the requested transaction details store 222; and EK=E(RPub, K) is the encryption of symmetric key K using the relying party device's public key RPub.

Block 504 directs the processor 210 to transmit the transaction request message IM to the processor 310 of the relying party, to thereby request the transaction that has been requested by the user with whom the plurality of user devices 200 are associated.

In this embodiment, the relying party processor 310 then receives the transaction request message and generates a transaction response message, as discussed in greater detail above in connection with block 402 and block 404 of the relying party authorization routine 400.

Accordingly, in this embodiment block 506 directs the processor 210 of the first user device 202 to receive, from the relying party system, requirements of the multi-device authorization policy that must be satisfied for the transaction to be approved. More particularly, in this embodiment block 506 directs the processor 210 to receive the transaction request response message TResp from the relying party system 302, the transaction response message defining the multi-device authorization policy for the transaction, as discussed above at block 404. To achieve this, block 506 directs the processor 210 to receive a message of the following form:

$$TransID \| TResp \| RSig \| APSig$$

where $\|$ denotes a concatenation operation, TransID and TResp are the contents of the transaction ID register 328 and the transaction response store 330, respectively, and RSig and APSig are the signatures generated above at block 404. Block 506 directs the processor 210 to store the received initiating response message in a transaction response store 224 in the RAM 220.

In this embodiment, block 506 then directs the processor 210 to validate the transaction request signature RSig, by computing:

$$V(RPub, TReq, RSig)$$

which is the verification of the signature RSig for the transaction request message TReq using the relying party's public key RPub. Similarly, in this embodiment block 506 also directs the processor 210 to validate the transaction response signature APSig, by computing:

$$V(RPub, TResp, APSig)$$

which is the verification of the signature APSig for the transaction response message TResp using the relying party's public key RPub.

In this embodiment, block 508 directs the processor 210 to construct a list of qualified reachable or available entities that can be used to attempt to satisfy the policy associated with the transaction. In this embodiment, in which a list of the user's devices that belong to the user's device conspiracy is maintained in the conspiracy devices store 266 and is similarly stored at the relying party's server in the records of the conspiracies store 364 pertaining to the current user, block 508 directs the processor 210 to identify satisfying entities among the plurality of user devices 200, by identifying records in the conspiracy devices store 266 of devices having attributes that satisfy one or more of the requirements specified by the multi-device transaction policy for the current transaction. Block 508 then directs the processor 210 to attempt to establish communications between the initiating entity and each such satisfying entity identified in the conspiracy devices store 266. If a satisfying entity is reachable by the initiating entity, and is able to establish a secure mutually authenticated link with the initiating entity, iEnt, then the satisfying entity is considered to be a qualified available entity.

For each qualified available device, block 508 directs the processor 210 to store identification and contact information for the device in a qualified available devices store 226 in the RAM 220. If desired, block 508 may also transmit identifications of all qualified available devices, or of qualified available strong devices, to the relying party system 302 to facilitate identification of available strong and weak devices at blocks 406 and/or 416 above.

In this embodiment, block 510 then directs the processor 210 to determine whether it is possible for the qualified available devices identified at block 508 to satisfy the multi-device transaction policy associated with the transaction. To achieve this, block 510 directs the processor 210 to compare the transaction response TResp stored in a TResp field of the transaction response store 224, which defines the possible combinations of devices that can satisfy the policy, to the list of devices stored in the qualified available devices store 226, and to determine whether any combination of the qualified available devices can satisfy the policy.

If it is not possible to satisfy the policy with the available devices, block 512 directs the processor 210 to cancel the transaction and notify the relying party. In this embodiment, block 512 further directs the processor 210 to display an error message on a display screen of the user device 202.

On the other hand, if the execution of block 510 identifies at least one combination of available devices that can satisfy the transaction policy, then blocks 514 and 516 direct the processor 210 to directly obtain respective transaction measurements from at least some available devices from among the plurality of user devices 200, or more particularly, from the weak devices among the plurality of user devices. To achieve this, block 514 directs the processor 210 to address the next entity in the qualified available devices store 226 that is identified as a "weak" entity (i.e. an entity can communicate with the initiating device but cannot directly communicate with the relying party).

In this embodiment, block 516 then directs the processor 210 to obtain and validate a transaction measurement from the currently addressed weak entity, in the same manner as described above in connection with block 410 in relation to the relying party system's acquisition and validation of transaction measurements from strong entities. Thus, in this embodiment block 516 configures the processor 210 to transmit an authorization request message to at least some of the available devices (more particularly to the "weak entity" devices among the available devices identified at block 508 above), and to receive transaction measurements from those available weak entity devices. More particularly, in this embodiment block 516 configures the processor 210 of the first user device 202 to obtain a digital signature from at least some of the available devices, namely the available weak entity devices, in the same manner as described above in connection with the digital signature TSig obtained by the relying party system from strong entity devices at block 410 of the relying party authorization routine.

In this embodiment, block 516 directs the processor 210 to store the received transaction measurement locally by appending it to the contents of a transaction measurements store 228 in the RAM 220.

In this embodiment, block 518 then directs the processor 210 to determine whether the multi-device authorization policy has already been satisfied by the transaction measurements that the initiating entity has acquired thus far from the user's weak devices (i.e., excluding any transaction measurements of strong entities obtained directly by the relying party). To achieve this, block 518 directs the processor 210 to determine whether the policy defined by the contents of the transaction response store 224 require a transaction measurement from at least one strong device, and if so then it is concluded that the policy is not satisfied. Otherwise, if at least one combination of all weak devices can satisfy the policy, block 518 directs the processor to compare the transaction proof, represented by the contents of the transaction measurements store 228, to the requirements of the policy represented by the contents of the transaction response store 224, to determine whether each possible combination of weak devices from which transaction measurements have been obtained will satisfy the policy.

If any such combination satisfies the policy, then block 524 directs the processor 210 to transmit each of the received weak entity transaction measurements to the relying party system 302. To achieve this, in this embodiment block 524 directs the processor 210 to transmit a transaction proof, including all of the individual transaction measurements stored in the transaction measurements store 228, to the relying party system 302. The relying party system will receive the transaction proof, append it to its own transaction proof which also includes strong entity transaction measurements, conclude that the transaction proof satisfies the policy, approve the request for the transaction, and cause the requested transaction to be carried out, as described above at blocks 418 to 422.

Accordingly, following transmission of the transaction proof to the relying party at block 524, blocks 526 and 528 direct the processor 210 to either confirm approval of the request for the transaction in response to confirmation that the transaction measurements satisfy the multi-device authorization policy associated with the transaction, or cancel the transaction. To achieve this, block 526 directs the processor 210 to await receipt of a transaction decision message from the relying party and to determine whether the transaction decision message provides the desired confirmation that the transaction measurements satisfy the policy, e.g., whether the transaction decision message is an approval of the transaction as discussed above at block 422, or a disapproval and cancellation of the transaction as discussed above at block 424.

In this embodiment, as discussed above in connection with block 422, if the transaction measurements obtained by the processor 210 and any transaction measurements obtained directly by the processor 310 of the relying party system satisfy the multi-device authorization policy for the transaction, then the processor 210 at block 526 will receive approval of the transaction in the form of the transaction decision message generated by the processor 310 at block 422.

Thus, if at block 526 it is determined that the transaction decision message is an approval of the transaction, then in this embodiment, block 528 directs the processor 210 to generate a discernible confirmation to the user that the transaction has been approved (e.g., by displaying a visual or audio-visual notification using a display screen and audio speakers of the user device 202). Thus, in this embodiment confirming approval of the transaction includes the user device processor 210 receiving the transaction approval message at block 526 which serves as confirmation that the transaction measurements satisfy the policy, and further includes the processor 210 discernibly confirming to the user that the transaction has been approved.

Conversely, if at block 526 a transaction cancellation message is received from the relying party, then block 512 directs the processor 210 to cancel the transaction request and to discernibly notify the user of the cancellation.

Alternatively, if at block 518 above it is determined that the transaction proof, consisting of the weak entity transaction measurements thus far obtained and stored in the transaction measurements store 228, does not yet satisfy the policy represented by the contents of the transaction response store 224, then in this embodiment block 520 directs the processor 210 to determine whether there are any other available weak entities identified in the qualified available devices store 226 for which a transaction measurement has not yet been obtained. If so, then the processor is directed back to continue executing blocks 514 and 516 to continue obtaining transaction measurements from weak entities, until either it is determined at block 518 that the transaction measurements satisfy the policy or it is determined at block 520 that there are no more available weak entities for which transaction measurements have not yet been obtained.

If at blocks 518 and 520 it is determined that the transaction proof does not yet satisfy the policy and that there are no more available weak devices from which to obtain transaction measurements, block 522 directs the processor 210 to determine whether the qualified available devices store 226 contains an identification of any strong devices, from which the relying party will be directly obtaining transaction measurements as discussed above in connection with blocks 408 and 410.

If so, then block 524 (discussed above) directs the processor 210 to transmit the transaction proof, consisting of the weak entity transaction measurements stored in the transaction measurements store 228, to the relying party, so that the relying party may append the weak entity transaction measurements to those obtained from strong entities to attempt to satisfy the policy. The relying party may respond back with either a transaction approval message as discussed above at block 422, or with a transaction cancellation message as discussed above at block 424. In this embodiment, if at block 526 a transaction approval message is received from the relying party, then blocks 526 and 528 direct the processor 210 to confirm approval of the requested transaction, as discussed earlier herein; otherwise, if at block 526 a transaction cancellation message is received from the relying party, then the transaction is cancelled as described above at block 512.

Alternatively, if at block 522 it is determined that there are no available "strong entities," then because it has already been determined at blocks 518 and 520 that transaction measurements have been obtained from all available weak devices without satisfying the policy, it follows that the policy will not be satisfied in this instance. Accordingly, block 512 directs the processor 210 to cancel the transaction request and to discernibly notify the user of the cancellation.

Following either confirmation of the approval of the transaction at block 528, or cancellation of the transaction at block 512, the initiating entity routine is then ended.

Non-Initiating Entity Authorization Routine

Figure 6:
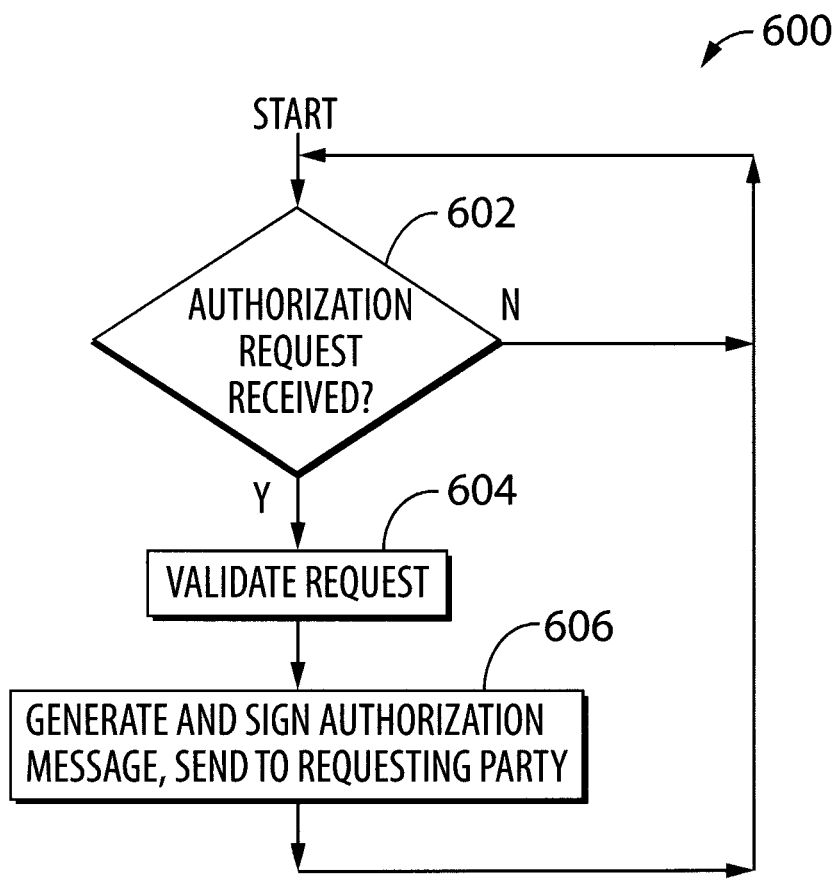
FIG. 6 is a flow chart of a non-initiating entity authorization routine executed by another user device of the system of FIG. 1.
Figure 7:
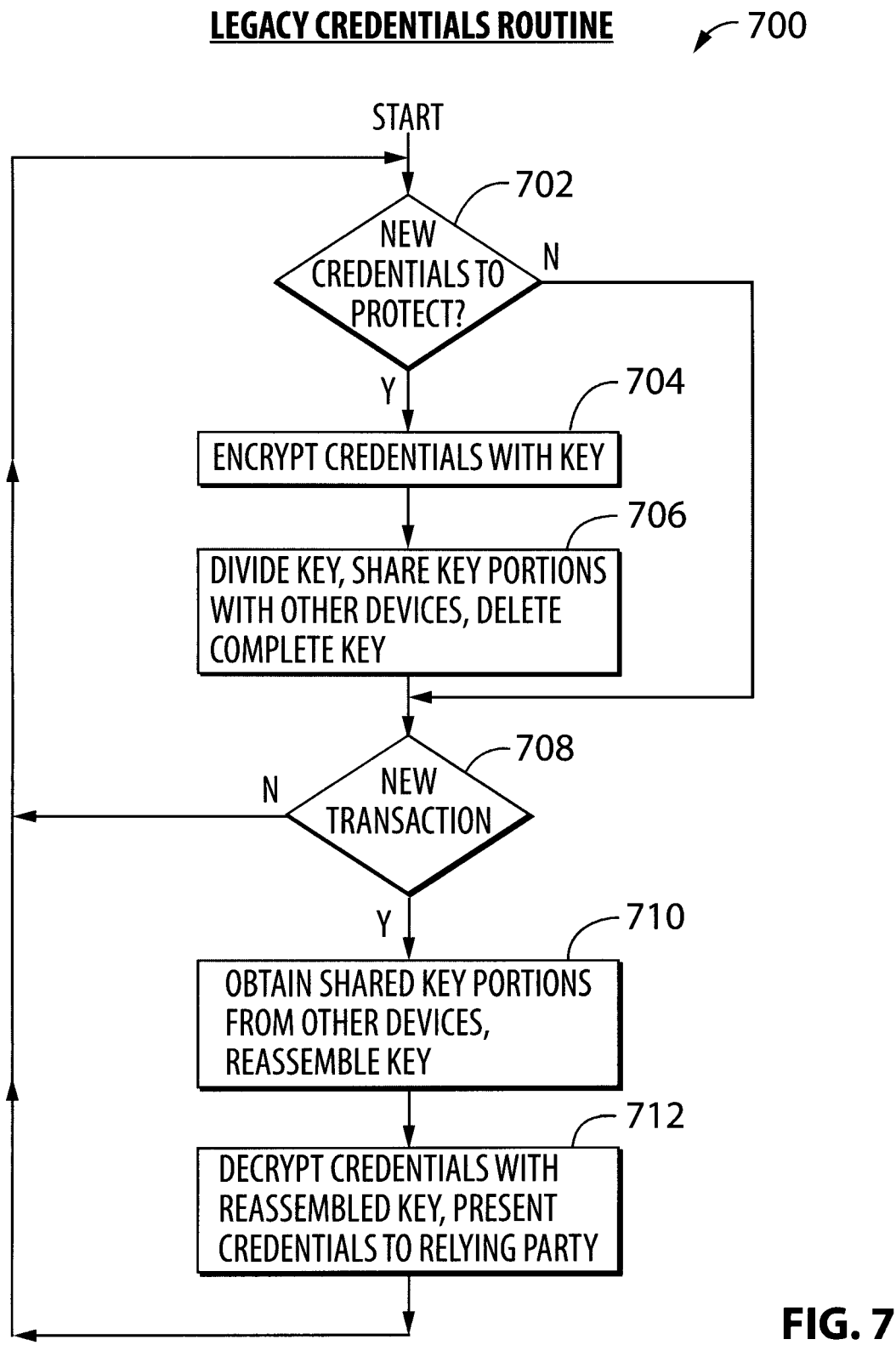
FIG. 7 is a flow chart of a backward compatibility legacy credentials routine executed by the system of FIG. 1.

Referring to FIGS. 1, 2 and 6, in this embodiment each of the user's devices 200 is also configured with a non-initiating entity authorization routine shown generally at 600 in FIG. 6, to enable the user's devices to receive and respond to authorization requests, which in this embodiment take the form of transaction measurement requests. Such authorization requests may be received from the relying party if the user device in question is a "strong" user device, or alternatively may be received from another one of the user's devices 200 if the device in question is a "weak" user device.

In this embodiment, the non-initiating entity authorization routine 600 begins with a first block 602 of codes, which directs a processor of the user's device to receive from the first user device 202, in respect of a request for a transaction requested by the user with whom the plurality of user devices 200 are associated, a request for a transaction measurement, the request including an indication of requirements of the multi-device transaction policy that must be satisfied for the transaction to be approved. To achieve this, block 602 directs the processor of the user's device to await receipt of a transaction measurement request message of the following form, which was explained in greater detail above in connection with block 410:

TransID∥TResp∥RSig∥APSig∥TReq.

Upon receipt of such a transaction measurement request message, block 604 directs the processor of the user's device to validate the transaction response signature APSig and the transaction request signature RSig of the message. It will be recalled from the discussion of block 404 above that RSig=S (RPriv, TReq) and APSig=S(RPriv, TResp). Accordingly, block 604 directs the processor of the user's device to validate these two signatures by computing:

V(RPub, TReq, RSig)=verification of the signature RSig of the transaction request message TReq using the relying party's public key RPub; and V(RPub, TResp, APSig)=verification of the signature APSig of the transaction response message TResp using the relying party's public key RPub.

If either of the signatures fails to validate, block 604 directs the processor of the user's device to transmit a transaction measurement refusal message to the entity from whom the transaction measurement request was received at block 602 (which is either the relying party if the current user device is a strong entity, or another one of the user's devices 200 acting as an initiating entity if the current user device is a weak entity).

Otherwise, after successful validation at block 604, block 606 directs the processor of the user's device to generate and transmit the requested transaction measurement to the first user device 202, wherein the transaction measurement includes a digital signature of a message that includes at least part of the request for the transaction measurement. To achieve this, block 606 directs the device processor to generate a transaction measurement message. More particularly, block 606 directs the processor of the user's device to first assemble the following concatenated message:

TransID∥RSig∥TReq.

Block 606 then directs the user device processor to generate a digital signature TSig of the above concatenated message using its private key IPriv, i.e., to calculate:

TSig=S(IPriv,(TransID∥RSig∥TReq)).

Block 606 then assembles the following concatenated transaction measurement message:

EM=CEID∥TransID∥TSig where CEID=the concatenation of the Conspiracy ID (CID) with the initiating entity ID (EID), and TransID=the contents of the transaction ID register 328. Block 606 directs the processor of the user device to transmit the above transaction measurement message to the party from whom the transaction measurement request originated (i.e. to the relying party as discussed at block 410 if the current user device is a strong entity, or to the initiating entity as discussed at block 516 if the current user device is a weak entity). The processor of the user device then continues to execute the non-initiating entity authorization routine 600 to await any further transaction measurement requests at block 602.

Illustrative Variations and Alternatives

Backward Compatibility Example: Legacy Credentials Routine

In view of the novel and inventive nature of the authentication methods disclosed herein involving a conspiracy of devices, in this embodiment the system 100 also includes a backward compatibility mode for the Conspiracy system in order to ease initial adoption. The backward compatibility mode eliminates the need for any changes at the requesting party system, and is therefore useful for transactions with requesting parties who are not yet aware of the conspiracy-based authentication methods disclosed in the present application. Only client side changes at the user devices 200 are required, comprising installing an extension to a web-browser and an application on all entities of a user's device conspiracy set.

A potential drawback of such a backward compatibility mode is that the policy is defined by or for the user only, and that the relying party system does not receive any guarantees on the transaction, i.e., this mode only satisfies user-defined policy on the client side. (If, however, the relying party system 302 becomes aware of the conspiracy-based authentication methods of the present disclosure and chooses to extend its authentication and authorization APIs, then the full set of device conspiracy benefits will be at its disposal.) In some embodiments, such as those involving enterprise environments where the relying party is the corporate enterprise server of the user's employer and has device management control over one or more of the user devices 200, the relying party system can effectively define policies on behalf of the user, that are signed and downloaded to Entities in the user's Conspiracy of devices; in this way, Enterprise security policy can govern user access to Enterprise information assets even in the absence of a Conspiracy-aware enterprise policy engine.

More generally, however, in the absence of such an enterprise environment, a backward compatibility mode may be provided. In this embodiment, one possible example of a backward compatibility mode is provided by execution of the legacy credentials routine shown generally at 700 in FIG. 7.

Generally, in this embodiment the legacy credentials routine 700 configures the processor 210 of the user device 202 to provide enhanced protection for so-called "legacy" authentication credentials that pre-date the present invention, such as simple or complex passwords or tokens, for example. For example, where the legacy credentials comprise a complex password of alphanumeric characters and special symbols, the security of a transaction requiring that password may be enhanced by imposing a user policy that requires multiple devices from among the plurality of user devices 200 to conspire together to provide the password to the relying party system. As a single-user example, a user may encrypt the password from a relying party website and use the Conspiracy of devices to protect the password encryption key (PEK). The PEK may be shared among various user devices 200 through an appropriate secret-sharing scheme, such as Shamir's Secret Sharing Scheme (SSSS), which is an m-of-n sharing scheme that requires the cooperation of at least m of the n devices that received shares, or through encryption with the public key of another device, for example.

Accordingly, in this embodiment the legacy credentials routine 700 begins with a first block 702 of codes, which directs the processor 210 of the user device 202 to await receipt of a request from a user to employ the user's conspiracy of devices, i.e. the plurality of user devices 200, to protect a new legacy credential, such as a password or token for example.

Upon receipt of such a request from the user, in this embodiment block 704 directs the processor 210 to prompt the user to manually enter the legacy credential itself if the credential is a password, or to enter a token storage location and filename if the credential is a token, for example. Block 704 further directs the processor 210 to generate a random symmetric encryption key K, to encrypt the received credential with the symmetric key K, to store the encrypted credential in an encrypted credentials store 280 in the computer-readable medium 260, and to delete any unencrypted copies of the credential (for example, the unencrypted copy of a password that would have been stored temporarily in the RAM 220 upon entry by the user, or the pre-existing copy of the token at the user-specified token storage location if the credential was a token).

In this embodiment, block 706 then directs the processor 210 of the user device 202 to divide the symmetric encryption key K into portions or shares, and to divide the shares among other devices of the plurality of user devices 200, according to an appropriate secret-sharing scheme as mentioned above. More particularly, in this embodiment block 706 directs the processor 210 to share the random symmetric encryption key K among the plurality of user devices 200 using an m of n secret sharing method implementing Shamir's Secret Sharing Scheme (SSSS), also known as an (m,n) threshold scheme, and improvements thereto.

Generally, the SSSS method uses polynomial interpolation invented by Adi Shamir (1979) and is known as a perfect secret sharing scheme (PSS). Using an implementation of SSSS, the conspiracy's key (in this case the private symmetric key K) can be split into n shares where only m shares are needed to reconstruct the private key (for example, in a 3-of-7 implementation, the key would be divided into shares distributed to seven of the user devices 200, but only three of those shares would be required to reconstruct the key K which is required to decrypt the legacy credential.

Advantages of this approach tend to include the following: (1) Secure: SSSS is information-theoretically secure; (2) Minimal: No share exceeds the size of the original secret; (3) Extensible: When m is fixed, the total number of conspiring devices, n can be dynamically increased/decreased without affecting the other shares—this means that new devices can be added incrementally to a Conspiracy without affecting existing members; (4) Flexible: Shares can be distributed unequally between members of the Conspiracy, so that, for instance, devices with higher security (such as those equipped with a Secure Element) can hold multiple shares as described in the specific conditions of the policy engine; (5) Dynamic: Security can be easily enhanced without changing the secret, but by changing the polynomial occasionally (keeping the same free term) and distributing new shares to the participants.

The SSSS method for Unix/Linux is an open source implementation that can be used to split and reconstruct a secret using m of n shares. See, e.g., http://en.wikipedia.orq/wiki/Shamir%27s Secret Sharing and http://point-at-infinity.org/ssss/ as of Jan. 18, 2016.

In this embodiment, once the shares of the random symmetric key K have been determined for distribution among the plurality of user devices, in this embodiment block 706 further directs the processor 210 to encrypt each share before transmitting the encrypted share to its respective receiving device. Typically, the receiving device will have an asymmetric public-private key pair, in which case block 706 directs the processor 210 to encrypt the share using the public key of the receiving device before sending the share to the receiving device. (Alternatively, if the user device 202 and the receiving device securely communicate using a different symmetric private key, i.e. a pre-established private key different than the symmetric key used to encrypt the legacy credential, then block 706 may direct the processor 210 to encrypt the share using the different symmetric private key.)

In this embodiment, after the shares of the random symmetric key K have been shared among the user devices 200, block 706 directs the processor 210 to delete the random symmetric key K from the user device 202. Block 706 further directs the processor 210 to generate and store a user policy record for the transaction in a user policies store 290 in the computer-readable medium 260, identifying the n user devices that received shares of the encryption key K, and specifying that key shares must be successfully obtained from at least m of those devices.

In this embodiment, following execution of block 706, or alternatively following non-receipt at block 702 of a new legacy credentials protection request, block 708 directs the processor 210 to await user input requesting a transaction with one of the relying party systems 300, for which the legacy credential is required.

If so, block 710 directs the processor 210 of the first user device to obtain a respective share of a shared secret from at least some of the available devices. More particularly, in the present embodiment, in which each share of the shared secret includes a portion of the private symmetric encryption key K, block 710 directs the processor 210 to reconstruct the encryption key K from the portions of the encryption key. To achieve this, block 710 directs the processor 210 to consult the user policies store 290 to identify a policy record associated with the requested transaction, and to identify from the policy record the n user devices that received shares of the encryption key K, and the fact that shares from at least m of those devices are required to reconstruct the key K. Block 710 directs the processor to transmit keyshare request messages to each of the n user devices that received shares of the encryption key K, and upon receiving at least m keyshares in response, block 710 directs the processor 210 to reconstruct the private symmetric key K that was originally used to encrypt the legacy credential.

Upon reconstructing the key K at block 710, in this embodiment block 712 directs the processor 210 to decrypt an encrypted credential using the encryption key K, and transmit the credential to the relying party system 302 for validation. More particularly, in this embodiment block 712 directs the processor 210 to decrypt the encrypted legacy credential which is currently stored, encrypted, in the encrypted credentials store 280. Block 712 further directs the processor 210 to transmit the legacy credential to the relying party system 300 with which the user device 202 has requested the transaction, preferably via a secure transmission, which may for example be achieved via encryption using the public key of the relying party's public-private key pair. Following secure transmission of the legacy credential to the relying party system 300, block 712 directs the processor 210 to delete any copies of the decrypted legacy credential from the user device 202.

Block 702 and 708 then direct the processor 210 to continue to await new user inputs requesting conspiracy-enhanced protection of legacy credentials, or requesting new conspiracy-enhanced security for a legacy credentials transaction, as described above.

In this embodiment, the legacy credentials routine 700 effectively assumes that the user device 202, which acted as the initiating entity (iEnt) that initiated the transaction with the relying party system, is not compromised. As is evident from the above description, the iEnt eventually gets access to the plaintext shared secret, namely the symmetric private key K. If the initiating entity were compromised and the key K were somehow surreptitiously intercepted, then this would potentially allow the surreptitious intercepting party to bypass and thus defeat the purpose of the conspiracy. This risk is initially justified in order to provide the offsetting advantages of backward compatibility, but ideally the backward compatibility modes will be offered only for a limited time, to be displaced by the methods described earlier herein as more and more relying party systems become conspiracy-aware and adopt conspiracy-driven authentication and authorization policies in order to exploit the advantages of such conspiracies.

It will be appreciated that in a backward compatibility mode such as that of the legacy credentials routine 700, since the relying party system 302 deals only with the user device 202 which acts as the initiating entity, and which ultimately supplies the expected legacy credential to the relying party system, the available devices of the user's conspiracy of devices effectively form the appearance of a single end-point for the transaction.

Ad Hoc Conspiracy

In the main embodiments described above, it was assumed that a list of the user's conspiracy devices is maintained in the conspiracy devices store 266 and in a broader conspiracies store 364 at the relying party system which would store the device conspiracy sets for all users of the relying party system. However, as mentioned earlier herein, such a list may be omitted in other embodiments. Instead, the initiating entity authorization routine 500 may be modified at block 508 to direct the processor 210 of the initiating entity to generate the list of reachable devices by attempting to establish communication with any of the user's devices that are reachable by iEnt, without regard to any predefined list of the conspiracy devices. Modified block 508 would transmit the list of reachable devices to the relying party, so that the relying party can then directly contact any strong entities among the available devices. Block 408 of the RP routine would also be modified, to address the strong entities that were identified to it by the iEnt in the list of reachable entities rather than in a predefined conspiracy set in the conspiracies store 364; likewise block 416 would be modified to determine whether the reachable entities identified to RP by iEnt include any weak entities, rather than using the conspiracy set.

Other Alternatives

Although the relying party and initiating entity authorization routines above both involved the relying party (RP) system directly communicating with "strong entity" user devices to obtain their transaction measurements, alternatively the initiating entity, such as the user device 202, may obtain all of the transaction measurements from all of the conspiracy devices including any strong entities among them, so that the relying party system need only communicate directly with the initiating entity. Such an alternative is not considered to further improve security beyond the improvements achieved by the embodiments described above, and in fact may slightly diminish security by creating a risk that malware on the initiating entity may intercept a strong entity's transaction measurement, but on the other hand, such an alternative may also advantageously reduce messaging and communication burdens upon the relying party systems 300, and may further allow the available devices of the conspiracy to form the appearance of a single end-point for the transaction.

Although the relying party and initiating entity authorization routines above both involved sequential polling of strong and weak user devices to obtain their transaction measurements, alternatively the transaction measurements can be requested in a single step by broadcasting a request message to the qualified available user devices. This may apply to the polling of strong entities by the relying party processor, or to the polling of weak entities (or all entities) by the initiating entity processor, or both. The initiating entity may forward the transaction measurements that it receives from the user devices to the relying party system all at once in a single message, or may forward them individually as they are received.

Although Shamir's Secret Sharing Scheme (SSSS) was described above only in connection with the legacy credentials routine operating in a backward compatibility mode, alternatively this scheme can be employed more broadly, for secure distributed storage of symmetric keys or any other private or sensitive information, so that no single device can reconstruct the distributed information without the co-operation of a minimum number of other user devices. More prominent use of SSSS may further enhance security, but may also add further redistribution steps to enroll new devices in the conspiracy.

In some embodiments, different sub-policies may be associated with different categories of users, or with different specific users. Thus, the multi-device authorization policy for a given transaction type may include a plurality of subpolicies for a plurality of respective user categories or users. For example, where the requested transaction is access to a confidential document, a subpolicy for managers may require less stringent authorization, involving fewer participating conspiracy devices, than subpolicies for developers or other employees.

INDUSTRIAL APPLICABILITY EXAMPLES

Illustrative embodiments of the invention have many industrially applicable uses. The following list is not intended to be exhaustive, but merely illustrative of the broad range of applicability of a device Conspiracy. Many variations of each use are possible, and many other categories of uses could be documented here.

Accessing an Information Target:

One typical use of the Conspiracy at an Enterprise is to access an information target belonging to the Enterprise. For instance, an employee may wish to retrieve a database from a corporate file server, either from work on her office desktop, or from home via her laptop over a virtual private network accessing the corporate LAN. In the first case, an example of an applicable Enterprise policy that must be satisfied in order to allow the requested in-office access could include the following:

user's smartphone must be implicitly (i.e., no explicit user interaction is neither requested nor required) proximal (e.g., within approximately five feet) to the desktop.

In the second case, an example of the Enterprise policy might be:
- user's smartphone must be explicitly proximal (user must enter PIN on laptop or provide biometric on smartphone), OR
- BOTH user's smartphone and user's smartwatch must be implicitly proximal.

Making an On-Line Purchase:

A typical consumer use of a Conspiracy, to enable an on-line purchase, may take place in the following ways, for example:
- When a user wants to pay for a selected item at a shopping website using PayPal, e.g., the final step of authorizing PayPal to release the funds may require explicit proximity of the user's iPhone. This could be achieved through the enforcement of a user-sanctioned policy resident at the PayPal site.
- When a user wants to complete a purchase by entering their credit card into the relevant field of a check-out page, the action can be completed only by implicit proximity of their smartphone: if the user wants the credit card information to be automatically populated, then explicit proximity of their smartphone is required. This policy can be enforced by a user-installed browser plug-in, for example.

Two-Person Integrity Authorization

In some regulated environments, one of the required security measures is to use two-person integrity (TPI) to prevent a single person-access to a transaction. The Conspiracy of devices may involve the combination of TPI in authorization situations such as the following examples:
- Bank teller providing authorization of a transaction;
- Trading floor activities where commodities, stocks or currency trades take place that are time sensitive;
- Electronic stock trading transactions;
- Portfolio manager performing transactions on behalf of a client;
- Online banking where transactions above a limit require multiple parties;
- Multiple doctors and pharmacists authorizing prescriptions;
- Doctor (attending physician) making critical patient care decisions when not physically present; or
- Retail and industrial environments where a manager has to be present to approve a transaction.

The authorization of a transaction occurs with the Conspiracy of the devices, though not all the participating devices have to be physically geo-located. Typically, methods such as calling a client's phone number to validate transactions is common. In many cases, the individual may not have access to cellular voice networks to authorize such transactions. The individual may have a higher chance of having all of the personal devices such as a laptop, tablet, wearable, and smartphone with an Internet connection to validate such transaction. In health care, a device Conspiracy is useful in the digital authorization of online prescription renewals, e.g., and requests for electronic Protected Health Information (ePHI). There are additional industrial applications within an enterprise health care or clinic environment, where decisions by a physician or doctor need to be authorized. The conspiracy allows a non-repudiable authorization for a healthcare professional that is not physically present but could be in a separate ward or in a different building.

Virtual Authentication Requirements

Virtual authentication requirements (VAR) act as a granular requirements that are based on known usage patterns in enterprises, work fleets, health care environments, etc.

To activate one's VAR, a set of conditions based on trusted locations must be satisfied. The VAR may be active for a specific period of time determined by the policy engine such as the beginning of a work shift, beginning of a work day, fleet schedule for a specific truck, etc. The individual's GPS location, Bluetooth beacons, proximity to a trusted asset, biometric such as Apple TouchID, or complex passphrase are utilized on a physical trusted device to activate the VAR. The policy engine has pre-determined trusted zones which the VAR may activate. Examples would be within the boundaries of a corporate campus, connected to the corporate Wireless LAN, inside a warehouse with Bluetooth beacons, in proximity to a fleet vehicle, or home office. Short range RF Personal Area Networks (PAN) such as Bluetooth Low Energy and Wireless LAN are suitable for assessing a trusted zone.

Time activation of the VAR determined by the policy engine is an important criterion in all aspects of authentication. Take the examples of a typical work schedule, which is all time-based such as standard office hours (9 to 5), banking hours, day shift and night shift. Once that period of time, T1, expires, the user typically does not need access to that corporate system until the next work period. Granular levels of time activations also include specific tasks such as a bank teller being assigned to a terminal for a morning slot, stock trading floor computer terminal, scheduled work inside of a Data Center, consultant working on a customer site, etc.

Virtual Smart Card

Typical policy engines that use traditional smart cards tend to suffer from a number of disadvantages, including the following:
- The end users need to manage the security based on the policy defined. The relying party's PDP and PEP do not have visibility into the adherence of the policy unless the end user physically interacts with such computer systems.
- Traditional smart-cards and chip-based credit cards require PIN codes and passphrases to establish a two-factor authentication. PIN codes are convenient but vulnerable to eavesdropping and use of complex passphrases is inconvenient.
- Smart cards may easily be lost or compromised without the individual knowing.
- Smart cards can easily be shared with unauthorized individuals.

In an illustrative embodiment, a conspiracy of devices as described above is used to implement a conspiracy-enabled Virtual Smart Card (VSC). As one example, a VSC may be securely stored by the conspiracy of user devices in the same way as the legacy credentials discussed above in connection with FIG. 7. The Conspiracy forms a strong trust model because there is a singular unit for each of the devices. Any single compromise or loss of a device does not represent a threat, and any threats are mitigated by re-constructing the new Conspiracy based on the sub-set of devices. The Conspiracy enabled VSC improvement reduces the time spent on the authentication or authorization while providing the relying-issuing party non-repudiation of the transaction. Furthermore, given that personal devices, which often hold personal confidential information, are used for authorization, there is less chance of them being shared with unauthorized individuals.

Another advantage of the Conspiracy approach is that no knowledge (passphrase or PIN) is needed to unlock the VSC. In this regard, modern day malware on mobile and personal computing platforms will track keyboard entries from the end user, which can ultimately steal the passphrase. This is an enhancement to the "something you have" and "something you know" modality of physical smart cards. With Conspiracy-enabled devices, the security architecture allows for greater robustness against software based attacks even if the host OS is compromised. Additionally, to prevent security threats such as cold boot attacks, the cryptography and reconstruction of the Conspiracy encryption keys are performed inside of the TPM. The reconstructed encryption keys are then discarded from the TPM once the transaction has been completed.

A VSC can be designed to fit existing Enterprise policies with Smart Cards.

While specific embodiments have been described and illustrated, such embodiments should be considered illustrative only and not as limiting the invention as defined by the accompanying claims.

What is claimed is:

1. A transaction authorization apparatus comprising:
   a hardware processor in communication with a computer-readable medium and a communications interface, wherein the processor is configured to:
   (a) receive a request for a transaction requested by a user with whom a plurality of user devices are associated;
   (b) obtain respective transaction measurements from at least some available devices from among the plurality of user devices; and
   (c) confirm approval of the request for the transaction in response to confirmation that the transaction measurements satisfy a multi-device authorization policy associated with the transaction;
   wherein the apparatus comprises a relying party system associated with a party relying upon an authentication of the user in respect of the transaction, wherein the processor comprises a processor of the relying party system, and wherein the processor is configured to receive the request for the transaction by receiving, at the relying party system, a transaction request message from a first user device of the plurality of user devices; and
   wherein the processor of the relying party system is configured to generate and transmit a request response to the first user device, the request response defining the multi-device authorization policy for the transaction.

2. The apparatus of claim 1 wherein the processor of the relying party system is configured to generate the request response to define the multi-device authorization policy using at least one Boolean expression.

3. The apparatus of claim 1 wherein the processor of the relying party system is configured to generate the request response to define the multi-device authorization policy using at least one disjunctive condition.

4. The apparatus of claim 1 wherein the processor of the relying party system is configured to generate the request response to define the multi-device authorization policy using at least one disjunctive condition and at least one conjunctive condition.

5. The apparatus of claim 1, wherein the processor of the relying party system is configured to generate the request response to include a condition that requires transaction measurements to be obtained from at least a minimum number of user devices.

6. The apparatus of claim 1, wherein the processor of the relying party system is configured to generate the request response to include a condition requiring respective transaction measurements to be transmitted directly to the relying party system from at least a minimum number of user devices.

7. The apparatus of claim 1, wherein the processor of the relying party system is configured to generate the request response to further specify whether at least one user device is required to obtain user interaction before the at least one user device transmits one of the transaction measurements.

8. The apparatus of claim 1 wherein the processor of the relying party system is configured to directly receive at least one of the transaction measurements from at least one of the available devices.

9. The apparatus of claim 1 wherein the processor of the relying party system is configured to receive, from the first user device, at least one of the transaction measurements of at least one of the available devices other than the first user device.

10. The apparatus of claim 1, wherein the processor of the relying party system is configured to obtain at least one of the transaction measurements for at least one of the user devices by obtaining a digital signature capable of being validated by at least the relying party system, and wherein the processor of the relying party system is further configured to validate the digital signature.

11. A system comprising the apparatus of claim 1 and further comprising the first user device of the plurality of user devices, wherein the first user device is configured to receive the request for the transaction by receiving user input from the user at the first user device.

12. The system of claim 11 wherein a processor of the first user device is configured to transmit a transaction request message to the relying party system.

13. A transaction authorization apparatus comprising:
   a hardware processor in communication with a computer-readable medium and a communications interface, wherein the processor is configured to:
   (a) receive a request for a transaction requested by a user with whom a plurality of user devices are associated;
   (b) obtain respective transaction measurements from at least some available devices from among the plurality of user devices; and
   (c) confirm approval of the request for the transaction in response to confirmation that the transaction measurements satisfy a multi-device authorization policy associated with the transaction;
   wherein the apparatus comprises a first user device of the plurality of user devices, wherein the hardware processor comprises a processor of the first user device, and wherein the processor of the first user device is configured to receive the request for the transaction by receiving user input from the user at the first user device;
   wherein the processor of the first user device is configured to transmit a transaction request message to a relying party system; and
   wherein the processor of the first user device is configured to obtain the transaction measurements by:
      receiving a request response message from the relying party system, the request response message defining the multi-device authorization policy;
      transmitting an authorization request message to the at least some of the available devices; and
      receiving the transaction measurements from the at least some of the available devices;

and wherein the processor of the first user device is further configured to transmit each received transaction measurement to the relying party system.

14. The apparatus of claim 13, wherein the processor of the first user device is configured to obtain a digital signature from at least some of the available devices.

15. The apparatus of claim 13, wherein the processor of the first user device is configured to obtain a respective share of a shared secret from at least some of the available devices.

16. The apparatus of claim 15, wherein each share of the shared secret comprises a portion of an encryption key, and wherein the processor of the first user device is configured to reconstruct the encryption key from the portions of the encryption key, decrypt an encrypted credential using the encryption key, and transmit the credential to a relying party system for validation.

17. The apparatus of claim 16 wherein the processor of the first user device is configured to receive a validation message from the relying party system confirming that the credential has been validated by the relying party system.

18. A transaction authorization method comprising:
(a) receiving a request for a transaction requested by a user with whom a plurality of user devices are associated, wherein receiving the request for the transaction comprises receiving, at a relying party system associated with a party relying upon an authentication of the user in respect of the transaction, a transaction request message from a first user device of the plurality of user devices;
(b) obtaining respective transaction measurements from at least some available devices from among the plurality of user devices;
(c) confirming approval of the request for the transaction in response to confirmation that the transaction measurements satisfy a multi-device authorization policy associated with the transaction; and
(d) the relying party system generating and transmitting a request response to the first user device, the request response defining the multi-device authorization policy for the transaction.

19. The method of claim 18 wherein the available devices cooperate to form the appearance of a single end-point for the transaction.

20. A non-transitory computer-readable medium storing instructions which, when executed by at least one processor, cause the at least one processor to execute a method comprising:
(a) receiving a request for a transaction requested by a user with whom a plurality of user devices are associated, wherein receiving the request for the transaction comprises receiving, at a relying party system associated with a party relying upon an authentication of the user in respect of the transaction, a transaction request message from a first user device of the plurality of user devices;
(b) obtaining respective transaction measurements from at least some available devices from among the plurality of user devices;
(c) confirming approval of the request for the transaction in response to confirmation that the transaction measurements satisfy a multi-device authorization policy associated with the transaction; and
(d) the relying party system generating and transmitting a request response to the first user device, the request response defining the multi-device authorization policy for the transaction.

\* \* \* \* \*